(12) United States Patent
Asao et al.

(10) Patent No.: US 6,894,414 B1
(45) Date of Patent: May 17, 2005

(54) ALTERNATOR

(75) Inventors: Yoshihito Asao, Tokyo (JP); Katsumi Adachi, Tokyo (JP); Akira Morishita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 294 days.

(21) Appl. No.: 09/698,206

(22) Filed: Oct. 30, 2000

(30) Foreign Application Priority Data

Dec. 24, 1999 (JP) .......................................... 11-368453
May 31, 2000 (JP) ....................................... 2000-162210

(51) Int. Cl.$^7$ ............................. H02K 3/12; H02K 1/16
(52) U.S. Cl. ........................ 310/179; 310/42; 310/184; 310/254
(58) Field of Search ....................... 310/42, 254, 263, 310/179, 184

(56) References Cited

U.S. PATENT DOCUMENTS

| | | | |
|---|---|---|---|
| 3,056,896 A | | 10/1962 | Ludemann et al. |
| 4,012,653 A | | 3/1977 | Shigeta et al. |
| 4,080,724 A | | 3/1978 | Gillette |
| 4,102,040 A | * | 7/1978 | Rich ........................... 310/254 |
| 4,402,129 A | * | 9/1983 | Kreuzer et al. ................ 29/596 |
| 4,692,646 A | * | 9/1987 | Gotou ......................... 310/184 |
| 5,592,731 A | | 1/1997 | Huang et al. |
| 5,729,072 A | | 3/1998 | Hirano et al. |
| 5,955,810 A | * | 9/1999 | Umeda et al. ............... 310/208 |
| 5,982,068 A | | 11/1999 | Umeda et al. |
| 5,994,813 A | * | 11/1999 | Umeda et al. ............... 310/180 |

FOREIGN PATENT DOCUMENTS

| | | | | |
|---|---|---|---|---|
| DE | 1763506 | | 11/1971 | |
| DE | 3901098 | * | 1/1989 | ............ H02K/3/28 |
| DE | 196 33 399 A1 | | 8/1996 | |
| DE | 199-22-794 | | 11/1999 | |
| EP | 248946 A1 | | 12/1987 | |
| EP | 833427 A1 | | 4/1998 | |
| EP | A 0 833 427 | | 4/1998 | |
| EP | 881752 A1 | | 12/1998 | |
| EP | A 0 917 278 | | 5/1999 | |
| GB | 2 108 772 | | 5/1983 | |
| JP | 53-91302 | | 11/1978 | |
| JP | 62-296732 | * | 12/1987 | ............ H02K/3/28 |
| JP | 63-161855 | * | 7/1988 | ............ H02K/3/28 |
| JP | 01-252141 | | 10/1989 | |
| JP | 3-226251 | * | 10/1991 | .......... H02K/19/22 |
| JP | 04/344138 | | 11/1992 | |
| JP | 08-019196 | | 1/1996 | |
| JP | 8-298756 | | 11/1996 | |
| JP | 10-084650 | | 3/1998 | |
| JP | 10-271716 | | 10/1998 | |
| JP | 11-155270 | | 6/1999 | |
| JP | 11-187599 | | 7/1999 | |
| JP | 11-289695 | | 10/1999 | |
| JP | 2000-125512 | | 4/2000 | |

OTHER PUBLICATIONS

Patent Abstracts of Japan, vol. 007, No. 27 (E–156) Feb. 3, 1983 & JP 57 183236 A (Mitsubishi Denki KK).
Patent Abstract of Japan, vol. 010, No. 197, Feb. 28, 1986.
Patent Abstracts of Japan, vol. 1997, No. 8, Aug. 29, 1997.
Patent Abstracts of Japan, vol. 1999, No. 4, Apr. 30, 1999.
Patent Abstracts of Japan, vol. 007, No. 226, Oct. 7, 1983.
Patent Abstracts of Japan, vol. 011, No. 061, Feb. 25, 1987.
Patent Abstracts of Japan, vol. 2000, No. 01, Jan. 31, 2000.
Patent Abstracts of Japan, vol. 007, No. 027, Feb. 3, 1983.

* cited by examiner

*Primary Examiner*—Burton Mullins
(74) *Attorney, Agent, or Firm*—Sughrue Mion, PLLC

(57) ABSTRACT

An alternator is provided with a polyphase stator winding including a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core, and the stator core being provided with an abutting portion extending axially such that the stator core becomes an annular shape by joining ends of the stator core at the abutting portions.

8 Claims, 39 Drawing Sheets

400

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 41 is a perspective of a stator of a conventional automotive alternator such as described in Japanese Patent No. 2927288, for example, FIG. 42 is a perspective showing a conductor segment used in the stator in FIG. 41, and FIGS. 43 and 44 are perspectives from a front end and a rear end, respectively, of part of the stator in FIG. 41.

This stator 300 includes: a stator core 301; a stator winding 302 wound onto the stator core 301; and insulators 304 mounted inside slots 303, the insulators 304 insulating the stator winding 302 from the stator core 301. The stator core 301 is a cylindrical laminated core laminated by stacking thin steel plates which are plate-shaped magnetic members, and has a number of slots 303 extending axially disposed at even pitch circumferentially so as to be open on an inner circumferential side. The stator winding 302 is constructed by joining a number of short conductor segments 305 in a predetermined winding pattern.

The conductor segments 305 are formed into a general U shape from an insulated copper wire material having a rectangular cross section, and are inserted from an axial rear end into pairs of slots 303 six slots apart (a pitch of one magnetic pole). Then, end portions of the conductor segments 305 extending outwards at a front end are joined to each other to constitute the stator winding 302.

More specifically, in pairs of slots 303 six slots apart, first conductor segments 305 are inserted from the rear end into first positions from an outer circumferential side within first slots 303 and into second positions from the outer circumferential side within second slots 303, and second conductor segments 305 are inserted from the rear end into third positions from the outer circumferential side within the first slots 303 and into fourth positions from the outer circumferential side within the second slots 303. Thus, within each slot 303, four straight portions 305a of the conductor segments 305 are arranged to line up in a row in a radial direction.

Then, end portions 305b of the conductor segments 305 extending outwards at the front end from the first positions from the outer circumferential side within the first slots 303 and end portions 305b of the conductor segments 305 extending outwards at the front end from the second positions from the outer circumferential side within the second slots 303 six slots away in a clockwise direction from the first slots 303 are joined to form an outer layer winding having two turns. In addition, end portions 305b of the conductor segments 305 extending outwards at the front end from the third positions from the outer circumferential side within the first slots 303 and end portions 305b of the conductor segments 305 extending outwards at the front end from the fourth positions from the outer circumferential side within the second slots 303 six slots away in a dockwise direction from the first slots 303 are joined to form an inner layer winding having two turns.

In addition, the inner layer winding and outer layer winding constituted by the conductor segments 305 inserted into the pairs of slots 303 six slots apart are connected in series to form one phase of the stator winding 302 having four turns.

A total of six phases of the stator winding 302 each having four turns are formed similarly. Then, two sets of three-phase stator winding portions are constructed by connecting three phases each of the stator windings 302 into alternating-current connections.

In the conventional stator 300 constructed in this manner, at the rear end of the stator core 301, turn portions 305c of the pairs of conductor segments 305 inserted into the same pairs of slots 303 are lined up in rows in a radial direction. As a result, the turn portions 305c are arranged in two rows circumferentially to constitute a rear-end coil end group.

At the front end of the stator core 301, on the other hand, joint portions formed by joining the end portions 305b of the conductor segments 305 extending outwards at the front end from the first positions from the outer circumferential side within the first slots 303 and the end portions 305b of the conductor segments 305 extending outwards at the front end from the second positions from the outer circumferential side within the second slots 303 six slots away, and joint portions formed by joining the end portions 305b of the conductor segments 305 extending outwards at the front end from the third positions from the outer circumferential side within the first slots 303 and the end portions 305b of the conductor segments 305 extending outwards at the front end from the fourth positions from the outer circumferential side within the second slots 303 six slots away are arranged to line up radially. As a result, joint portions formed by joining end portions 305b to each other are arranged in two rows circumferentially to constitute a front-end coil end group.

In the stator 300 of an automotive alternator having the above construction, because the stator winding 302 is constructed by inserting short conductor segments 305 formed in the general U shape into the slots 303 of the stator core 301 from the rear end and joining end portions 305b of the conductor segments 305 extending outwards at the front end, the coil end groups are composed of a large number of joint portions, allowing short-circuiting accidents to occur easily because the joint portions easily short-circuit with each other.

A large number of the short conductor segments 305 must be inserted into the stator core 301 and their end portions must be joined by welding, soldering, etc., making operability significantly poor. Furthermore, the amount of each conductor segment 305 which is inserted into the slots 303 must be greater than the length of the stator core 301, facilitating damage to the insulation and reducing the quality of the finished product in addition, when joining the end portions, short-circuiting often occurs between the joint portions due to spilt solder or weld melt, making mass-producibility significantly poor.

In contrast to the conventional construction using conductor segments 305, Japanese Patent Laid-Open No. HEI 8-298756 discloses a stator construction consisting of a number of coil pieces formed by winding a number of straight-angled conductors a number of times into a generally hexagonal shape in advance and inserting the coil pieces into slots in semicircular divided core portions.

In this stator, the coil pieces are inserted into the slots of semicircular divided core portions in order in a radially outward direction. In other words, first facing side portions of the hexagonal coil pieces are positioned in an inner circumferential layer which is a layer on the inner side of the slots, and second facing side portions are positioned in an outer circumferential layer which is a layer on the outer side a predetermined number of slots away.

In this stator, although the alignment of the coil ends extending outwards from the slots is good, when joining the divided core portions to each other, the first side portions of the coil pieces are already inserted into the slots of a first divided core portion but because it is necessary to perform the operation of inserting the coil pieces into the slots of a second divided core portion at the same time as the operation of connecting the divided core portions, a temporary holding jig or the like must be used to perform a complicated operation, making productivity significantly poor.

Furthermore, when new coil pieces are inserted into the outer circumferential layer behind the coil pieces inserted previously into the inner circumferential layer of the slots, it is necessary to raise the previous coil pieces, and because this involves rotating and raising a number of straight-angled conductors of the side portions of the previously-inserted coil pieces remaining in the slots, there have been limitations to improving the space factor of the conductors within the slots.

Japanese Patent Laid-Open No. HEI 9-103052 discloses a stator 400 in which winding groups formed in a straight shape are inserted into a straight-shaped base core in a slot depth direction and the base core is bent into a cylindrical shape in a later process in order to improve the space factor of the conductors in the slots. FIG. 45 is an overall perspective of the stator 400 manufactured by this method. Although, insertion of the winding groups is significantly improved, because the winding groups have straight bridging portions extending circumferentially between the slots 401, the alignment of coil ends 402 extending outwards from the slots 401 is significantly poor, leading to increased radial dimensions and short-circuiting between the conductors in the coil ends 402. Furthermore, because the straight-shaped base core is made into a cylinder without modification, a significant amount of bending force is required and spring back is strong, leading to problems such as the formation of gaps at the joined surfaces in the resulting cylinder, and to deterioration in output and magnetic noise, etc.

In the conventional automotive alternator disclosed in Japanese Patent No. 2927288, problems have been that a large number of the short conductor segments 305 must be inserted into the stator core 301 and their end portions must be joined by welding, soldering, etc., making operability significantly poor, and when joining the end portions, that short-circuiting often occurs between the joint portions due to spilt solder or weld melt, making mass-producibility significantly poor.

In the alternator of Japanese Patent Laid-Open No. HEI 8-298756, problems have been that the assembly operation of the stator is poor, requiring a complicated operation using a temporary holding jig, and that the space factor of the conductors in the slots has been poor, etc.

In the automotive alternator disclosed in Japanese Patent Laid-Open No. HEI 9-103052, the alignment of coil ends 402 extending outwards from the slots 401 is significantly poor, leading to increased radial dimensions and short-circuiting between the conductors in the coil ends 402, and a significant amount of bending force is required to make the straight-shaped base core into a cylinder without special treatment, making spring back strong and leading to problems such as the formation of gaps at the joint surface in the resulting cylinder, deterioration in output and magnetic noise, etc.

SUMMARY OF THE INVENTION

The present invention aims to solve the above problems and an object of the present invention is to provide an alternator of simplified manufacture enabling improvement of coil end alignment, the space factor of the conductors to in the slots, etc.

To this end, according to the present invention, there is provided an alternator comprising: the polyphase stator winding including a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core; and the stator core provided with an abutting portion extending axially such that the stator core becomes an annular shape by joining ends of the stator core at the abutting portion.

According to another aspect of the present invention, there is provided an alternator comprising: the polyphase stator winding including a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core; and the stator core including an inner circumferential core portion provided with teeth on a side near the rotor, the teeth defining the slots, and an outer circumferential core portion fitted over an outer circumferential surface of the inner circumferential core portion.

DETAILED DESCRIPTION OF THE PREFERRED EMBODIMENTS

The constructions of automotive alternators according to preferred embodiments of the present invention will now be explained with reference to the drawings.

Embodiment 1

Figure 1:
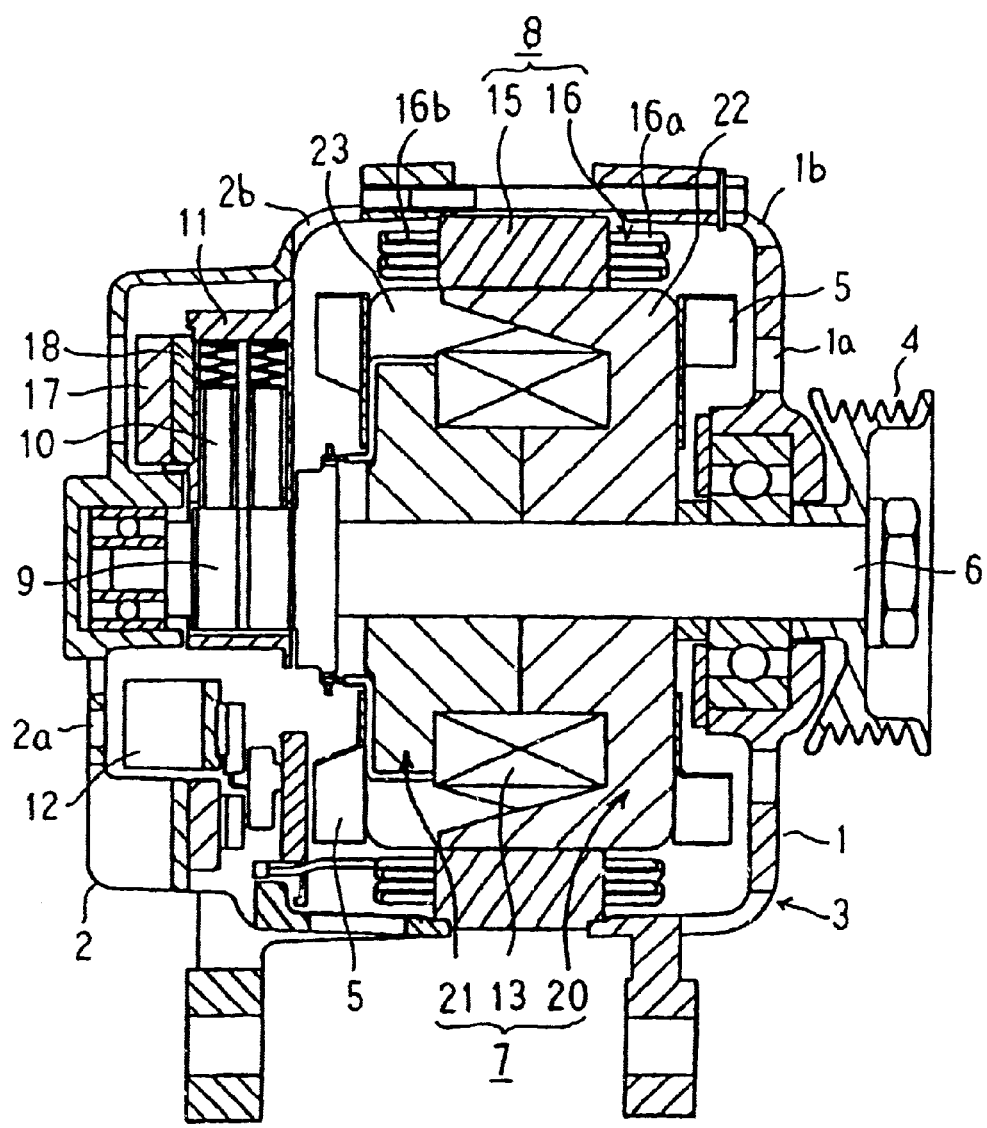
FIG. 1 is a cross section of an automotive alternator according to Embodiment 1 of the present invention.
Figure 2:
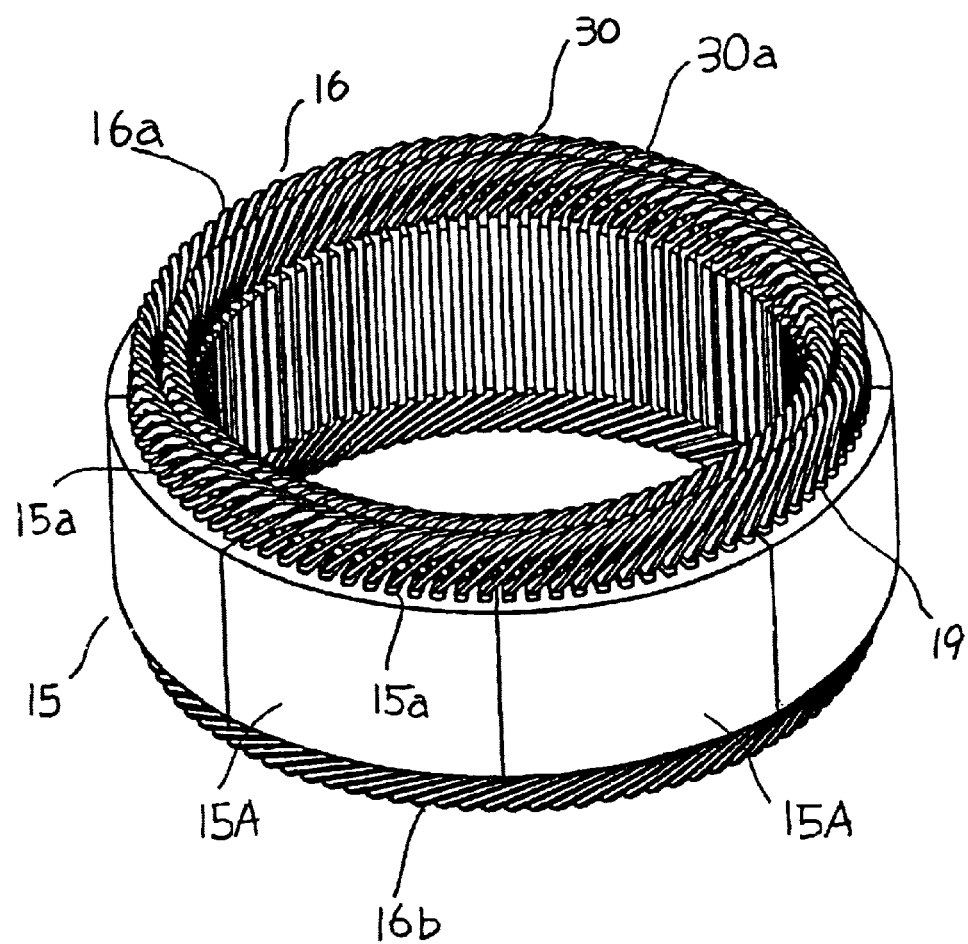
FIG. 2 is a perspective of a stator in FIG. 1.
Figure 3:
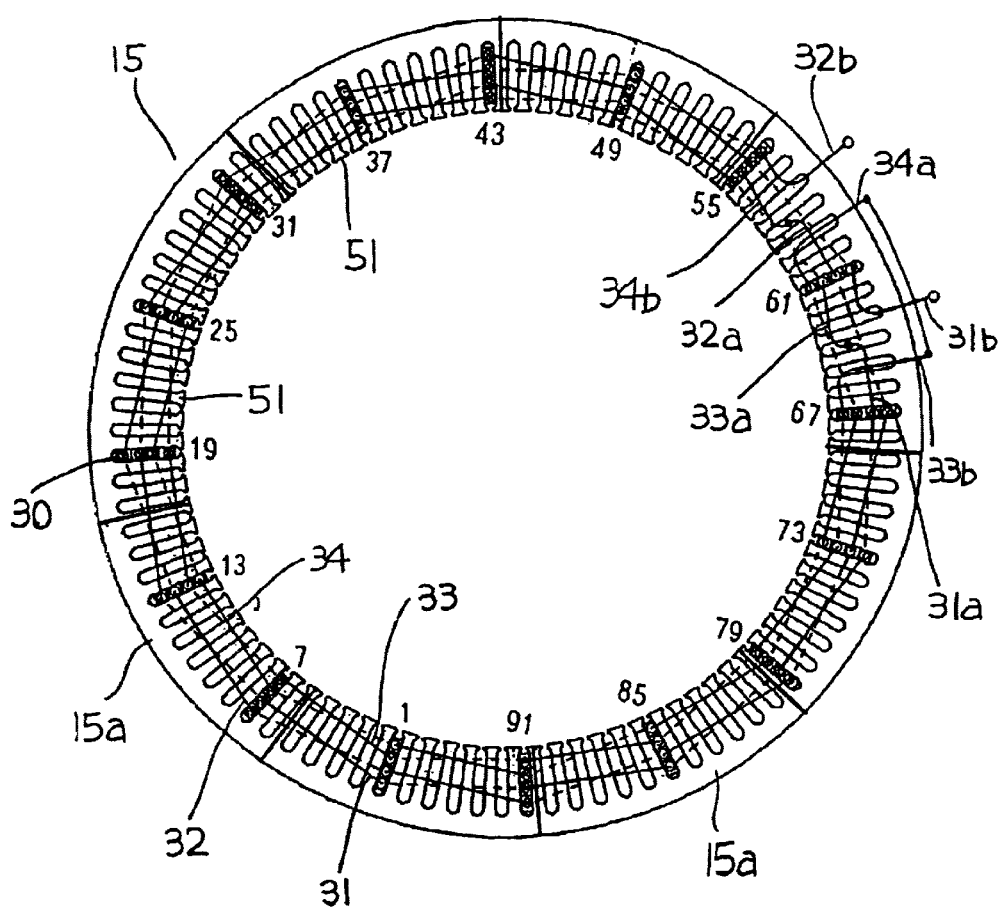
FIG. 3 is an end elevation explaining connections in one phase of stator winding group in FIG. 1.
Figure 4:
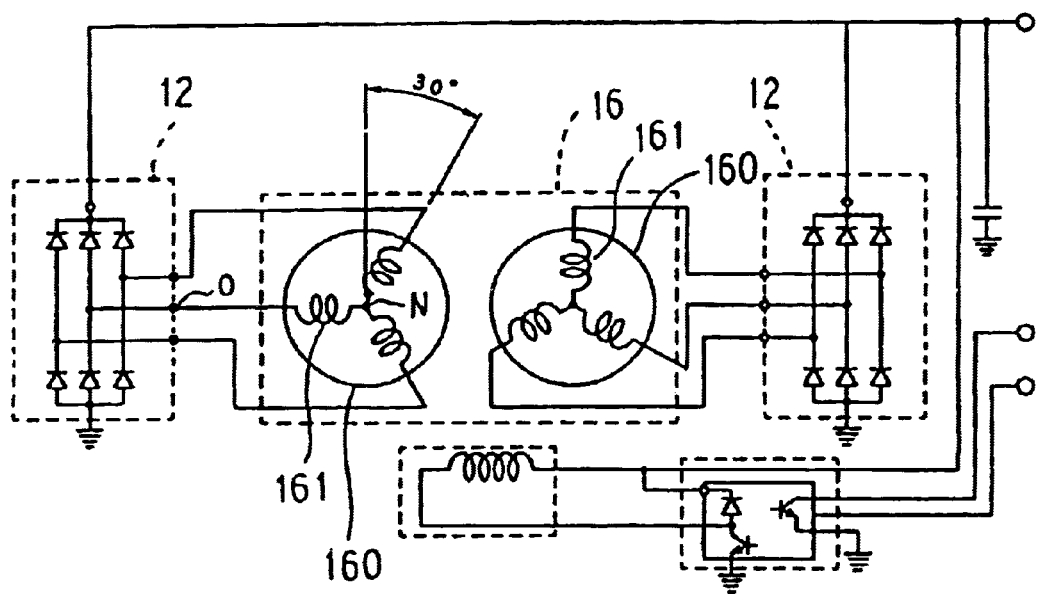
FIG. 4 is a circuit diagram for the automotive alternator in FIG. 1.
Figure 5:
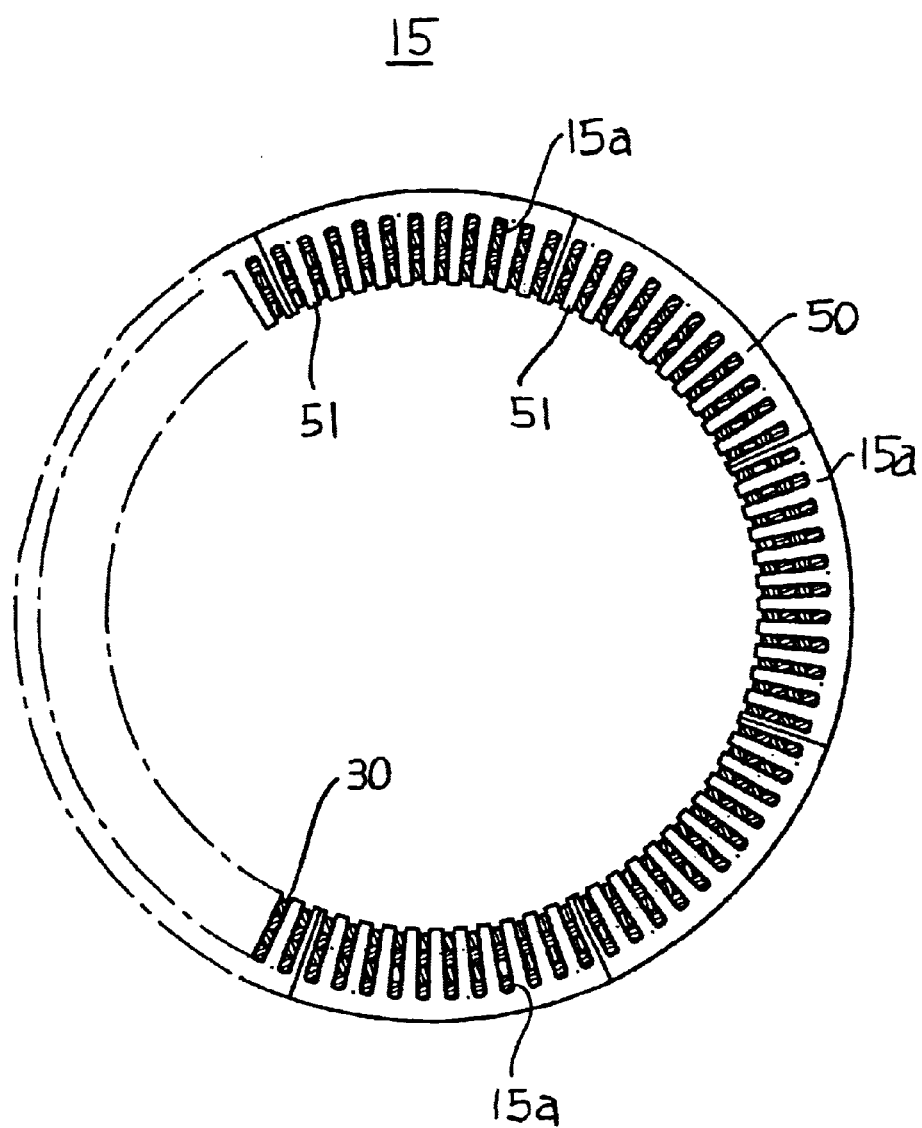
FIG. 5 is a cross section of the stator in FIG. 1.
Figure 6:
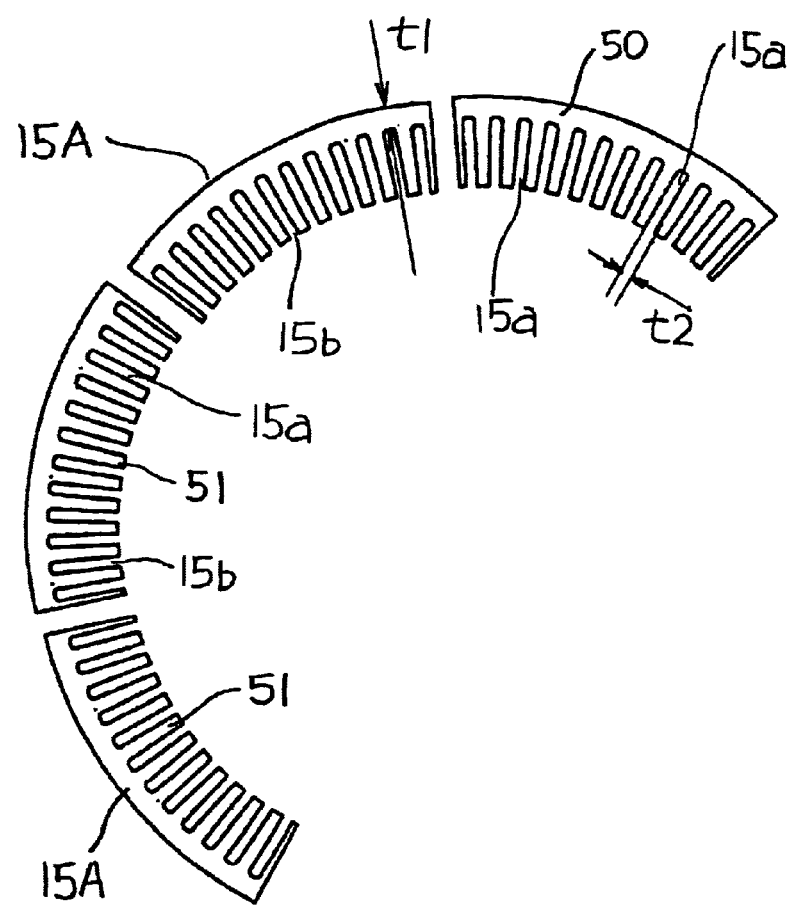
FIG. 6 is a cross section of a stator core in FIG. 1.
Figure 7:
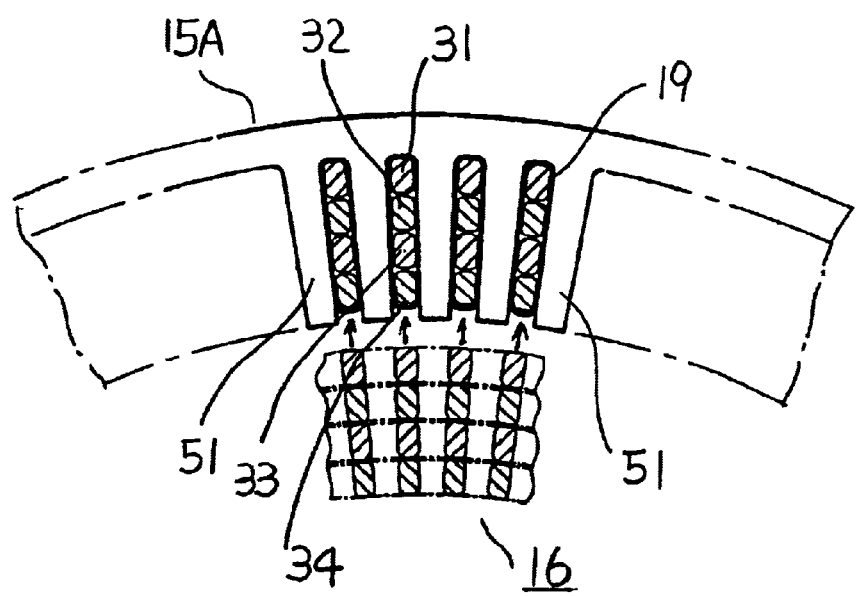
FIG. 7 is a diagram showing the winding sub-portions being inserted into the stator core in FIG. 1.

FIG. 1 is a cross section showing the construction of an automotive alternator according to Embodiment 1 of the present invention, FIG. 2 is a perspective of the stator of this automotive alternator, FIG. 3 is an end elevation explaining connections in one phase of stator winding group in this automotive alternator, FIG. 4 is a circuit diagram for this automotive alternator, FIG. 5 is a partial cross section of the stator in FIG. 1, FIG. 6 is a partial cross section of the stator core in FIG. 1, and FIG. 7 is a partial cross section of the stator in FIG. 5.

This alternator includes: a case 3 composed of an aluminum front bracket 1 and an aluminum rear bracket 2; a shaft 6 disposed within the case 3 having a pulley 4 secured to a first end thereof, a Lundell-type rotor 7 secured to the shaft 6; fans 5 secured to both axial end surfaces of the rotor 6; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 includes a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic from The pair of pole cores 20 and 21 are made of iron and each has eight claw-shaped magnetic poles 22 and 23 secured to the shaft so as to be spaced at even pitch circumferentially around outer circumferential edges, facing each other so as to intermesh.

As shown in FIG. 2, the stator 8 includes: a cylindrical stator core 15 composed of a laminated core formed with a number of slots 15a extending axially at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes a number of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Air intake vents 1a and 2a are formed in axial end surfaces of the front bracket 1 and the rear bracket 2, and air discharge vents 1b and 2b are disposed in two outer circumferential shoulder portions of the front bracket 1 and the rear bracket 2, opposite the radial outside of the front-end and rear-end coil ends 16a and 16b of the stator winding 16.

The stator core 15 is composed of eight divided core portions 15A cut radially through teeth 51, the divided core portions 15A being provided with abutting portions. The divided core portions 15A are formed by laminating SPCC material having a thickness of 0.35 mm and are integrated by laser welding an outer circumferential portion. A radial dimension t1 of a core back portion 50 of each of these divided core portions 15A is 3.6 mm, and a width dimension of the slots 15a is substantially constant at 1.9 mm from a floor portion to an opening portion 15b.

Next, the winding construction of one phase of stator winding group 161 will be explained in detail with reference to FIG. 3.

One phase of stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every si)dh slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 67 and a first end portion 33a of the third winding sub-portion 33 extending outwards from slot number 61 are joined, and a second end portion 33b of the third winding sub-portion 33 extending outwards from slot number 67 and a first end portion 31b of the fourth winding sub-portion 34 extending outwards from slot number 61, and in addition, a second end portion 34b of the fourth winding sub-portion 34 extending outwards from slot number 55 and a first end portion 32a of the second winding sub-portion 32 extending outwards from slot number 61 are joined to form a stator winding group 161 which has four turns of winding.

Moreover, the second end portion 31b of the first winding sub-portion 31 becomes a lead wire (O), and the second end portion 32b of the second winding sub-portion 32 becomes a neutral point (N).

A total of six phases of stator winding groups 161 are similarly formed by offsetting the slots 15a into which the strands of wire 30 are wound one slot at a time. Then, as shown in FIG. 4, the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Moreover, the two sets of three-phase stator winding portions 160 are installed in the stator core 15 so as to have a phase difference of 30°.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil end groups 16a and 16b.

In the automotive alternator of the above construction, the cylindrical polyphase stator winding 16 is formed first Then, each of the divided core portions 15A is pushed in a radially inward direction from the outer circumferential side of the polyphase stator winding 16 so that the first to fourth winding sub-portions 31 to 34 are inserted into each of the slots 15a through each of the opening portions 15b. Before this insertion, the opening portions 15b of each of the slots 15a are covered by the insulators 19 so that the insulators 19 are interposed between the first to fourth winding sub-portions 31 to 34 and inner wall surfaces of the slots 15a of the divided core portions 15A as a result of the insertion of the first to fourth winding sub-portions 31 to 34.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, exemplar air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge vents 2b. At the same time, at the front end, external air is drawn in axially through the air intake vents 1a by rotation of the fans 5, and is then deflected centrifugally by the fans 5, cooling the front-end coil end group 16a of the polyphase stator winding 16 before being expelled to the outside through the air discharge vents 1b.

In this manner, according to Embodiment 1, the operation of installing the polyphase stator winding 16 in the stator core 15 is improved compared to the conventional art, in which a large number of conductor segments 305 are inserted into the slots one at a time, by first forming the cylindrical polyphase stator winding 16, then pushing each of the divided core portions 5A in a radially inward direction from the outer circumferential side of the polyphase stator winding 16 so that the first to fourth winding sub-portions 31 to 34 are inserted into each of the slots 15a through each of the opening portions 15b. Moreover, the insulators 19 are easily interposed between the first to fourth winding sub-portions 31 to 34 and the inner wall surfaces of the slots 15a during the insertion of the first to fourth winding sub-portions 31 to 34.

Because the first to fourth winding sub-portions 31 to 34 constituting the polyphase stator winding 16 are each composed of one strand of wire 30 (continuous wire), it is not necessary to insert a large number of short conductor segments 305 into the stator core 301 and join end portions 305b to each other by welding, soldering, etc., as was required in the conventional stator 300, en enabling the productivity of the stator 8 to be improved significantly.

Because the coil ends are constituted by the turn portions 30a of the strands of wire 30, the joints in the coil end groups 16a and 16b are the first and second end portions of the first to fourth wincing sub-portions 31 to 34 and the bridging connection joint portions, significantly reducing the number of joints. Thus, because the occurrence of short-circuiting accidents which accompany loss of insulation due to the joining process can be suppressed, superior insulation can be achieved. Furthermore, the conductors are not softened by welding, raising the rigidity of the stator as a whole and enabling magnetic noise to be reduced.

The coil end groups 16a and 16b are constructed by arranging the turn portions 30a neatly in rows circumferentially so that they do not interfere with each other. Thus, compared to the conventional coil end groups in which the end portions 305b of the conductor segments 305 were joined to each other, the height to which the coil end groups extend outwards from the stator core 15 can be reduced. Thus, wind resistance in the coil end groups 16a and 16b is reduced, enabling the reduction of wind noise due to the rotation of the rotor 7. Coil leakage reactance in the coil ends is also reduced, improving output and efficiency.

Four strands of wire 30 are arranged so as to line up in a row radially within each slot 15a, and the turn portions 30a are arranged to line up in two rows circumferentially. Thus, the turn portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

Because the straight portions 30b of the strands of wire 30 are formed with a rectangular cross section, the cross-sectional shape of the straight portions 30b fits neatly into the shape of the slots 15a when the straight portions 30b are housed inside the slots 15a. Thus, the insertion of the divided core portions 15A in to the polyphase stator winding 16 is improved and the space factor of the strands of wire 30 inside the slots 15a is easily increased, enabling improved transfer of heat from the strands of wire 30 to the stator core 15.

Embodiment 2

Figure 8:
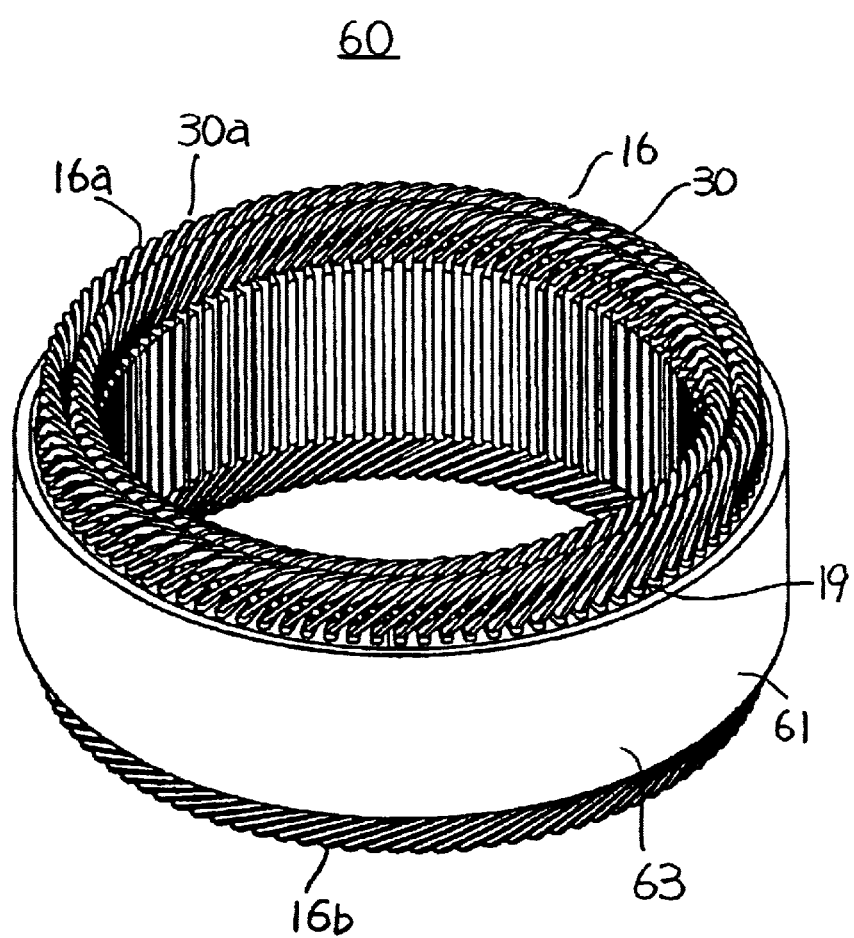
FIG. 8 is a perspective of a stator of an automotive alternator according to Embodiment 2 of the present invention.
Figure 9:
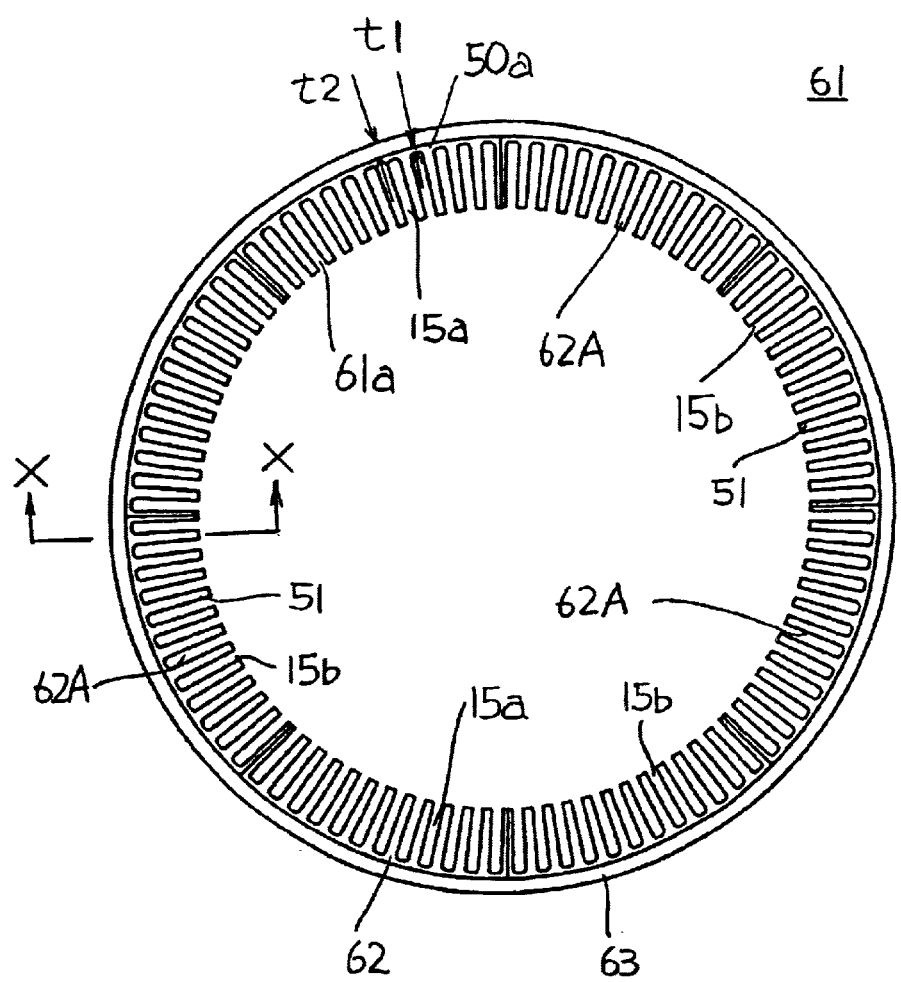
FIG. 9 is a cross section of a stator core in FIG. 8.
Figure 10:
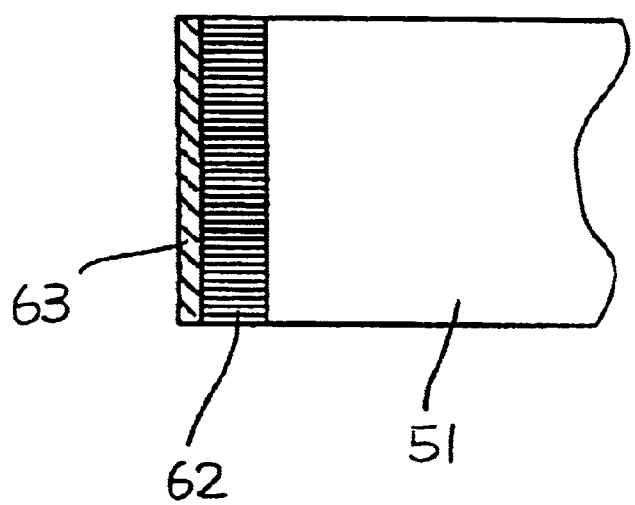
FIG. 10 is a partial cross section of the stator core in FIG. 9 taken along line X—X.

FIG. 8 is a perspective of a stator 60 of an automotive alternator according to Embodiment 2 of the present invention, FIG. 9 is a cross section of a stator core 61 in the stator 60 in FIG. 8, and FIG. 10 is a partial cross section of the stator core 61 in FIG. 9 taken along line X—X. Moreover, in each of the following embodiments portions the same as or corresponding to those in Embodiment 1 will be given the same numbering.

In this embodiment, a stator 60 includes: a cylindrical stator core 61 composed of a laminated core formed with a number of slots 61a extending axially at a predetermined pitch in a circumferential direction; a polyphase stator winding 16 wound onto the stator core 61; and insulators 19 installed in each of the slots 15a for electrically insulating the polyphase stator winding 16 from the stator core 61.

The stator core 61 includes: an inner circumferential core portion 62 formed with ninety-six slots 15a at even pitch so as to house two sets of three-phase stator winding portions 160 such that the number of slots housing each phase of the winding portions corresponds to the number of magnetic poles (sixteen) in the rotor 7; and a pipe-shaped outer circumferential core portion 63 press fitted over the inner circumferential core portion 62. The inner circumferential core portion 62 is composed of eight divided core portions 62A cut radially through teeth 51. The divided core portions 15A are provided with abutting portions, are formed by laminating SPCC material having a thickness of 0.35 mm, and are integrated by laser welding an outer circumferential portion. A radial dimension t1 of a core back portion 50a of each of these divided core portions 62A is 1 mm, and a thickness dimension t2 of the outer circumferential core portion 63 is 2.6 mm.

Figure 11:
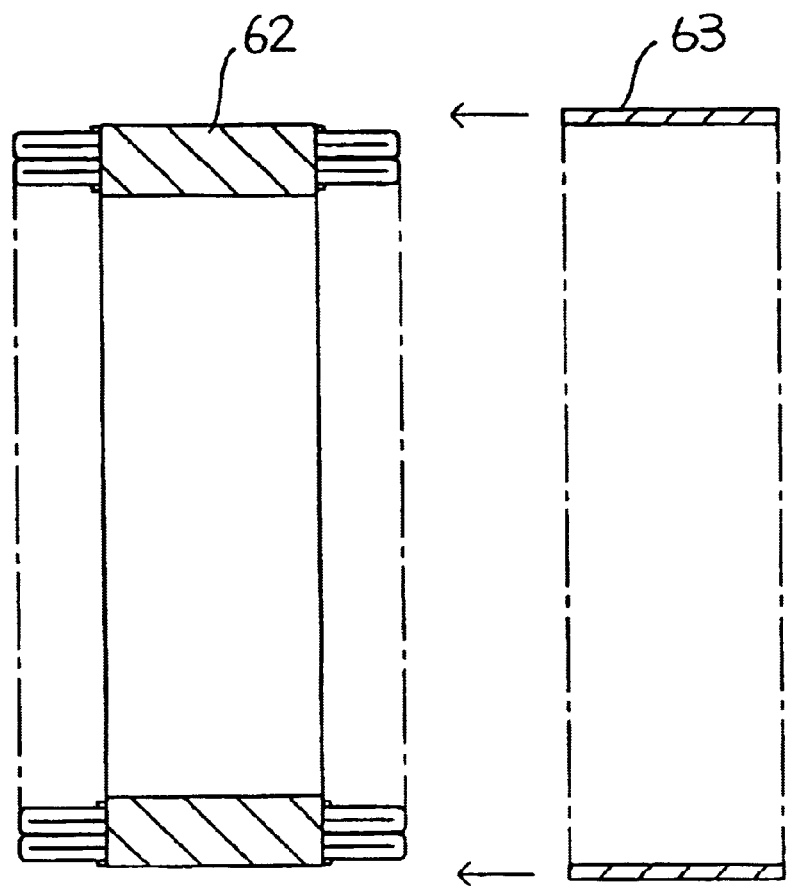
FIG. 11 is a diagram showing an outer circumferential core portion being fitted over an inner circumferential core portion in FIG. 9.

In the automotive alternator of the above construction, the cylindrical polyphase stator winding 16 is formed first Then, each of the divided core portions 62A is pushed in a radially inward direction from the outer circumferential side of the polyphase stator winding 16 so that the first to fourth winding sub-portions 31 to 34 are inserted into each of the slots 15a through each of the opening portions 15b. Before this insertion, the opening portions 15b of each of the slots 15a are covered by the insulators 19 so that the insulators 19 are interposed between the first to fourth winding sub-portions 31 to 34 and inner wall surfaces of the slots 15a of the divided core portions 62A as a result of the insertion of the first to fourth winding sub-portions 31 to 34. Thereafter, the inner circumferential core portion 62 is press fitted into the outer circumferential core portion 63, as shown in FIG. 11, to complete the manufacture of the stator 60.

According to Embodiment 2, the operation of installing the polyphase stator winding 16 in the stator core 61 is improved compared to the conventional art, in which a large number of conductor segments 305 are inserted into the slots one at a time, by first forming the cylindrical polyphase stator winding 16, then pushing each of the divided core portions 62A in a radially inward direction from the outer circumferential side of the polyphase stator winding 16 so that the first to fourth winding sub-portions 31 to 34 are inserted into each of the slots 15a through each of the opening portions 15b.

The inner circumferential core portion 62 is constructed by laminating steel plates having a thickness of 0.35 mm, but since the radial dimension t1 of the core back portion 50a of the inner circumferential core portion 62 which is bent is small compared to that of Embodiment 1, straight-shaped divided core portions can be easily bent to form the divided core portions 62A. Furthermore, because the radial dimension t1 of the core back portion 50a of the inner circumferential core portion 62 is small and the rigidity of the inner circumferential core portion 62 is low, the entire divided core portion 62A is compressed radially inwards by the constriction of the outer circumferential core portion 63 from the radial outside, reducing gaps between the inner circumferential core portion 62 and the outer circumferential core portion 63 and enabling reductions in magnetic performance to be suppressed.

Because the inner circumferential core portion 62 is supported from outside by fitting the cylindrical outer circumferential core portion 63 over the inner circumferential core portion 62, a structurally preferable degree of inner radial roundness can be easily achieved, and the rigidity of the stator core 61 itself is improved, suppressing the occurrence of electromagnetic noise, etc.

Embodiment 3

Figure 12:
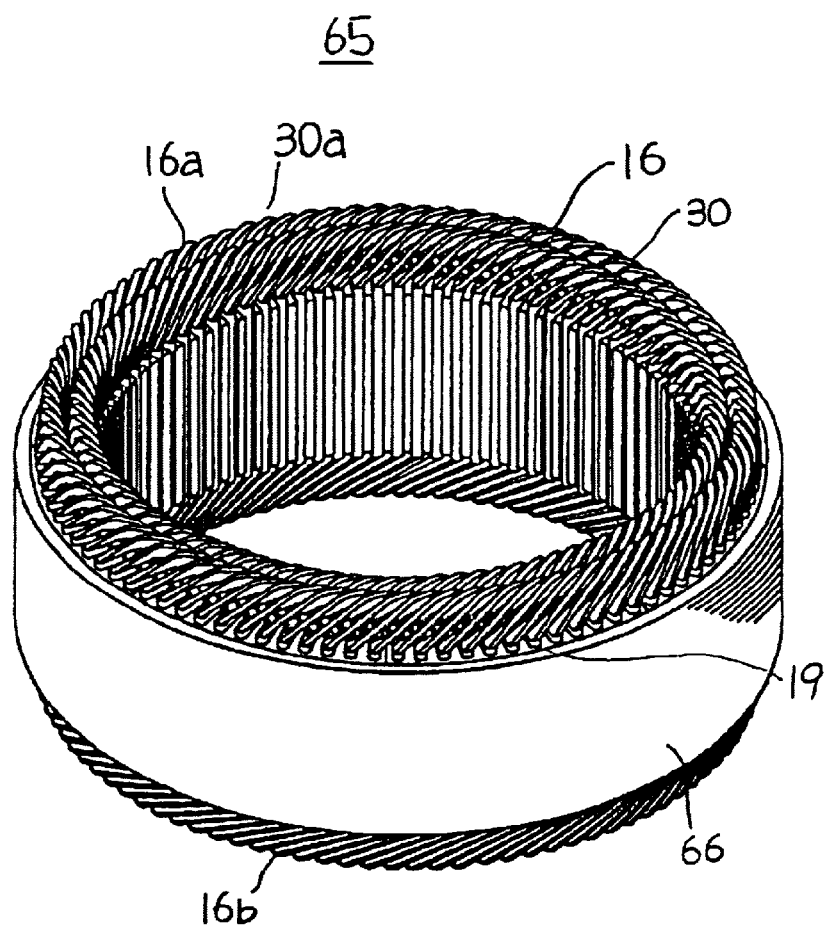
FIG. 12 is a perspective of a stator of an automotive alternator according to Embodiment 3 of the present invention.
Figure 13:
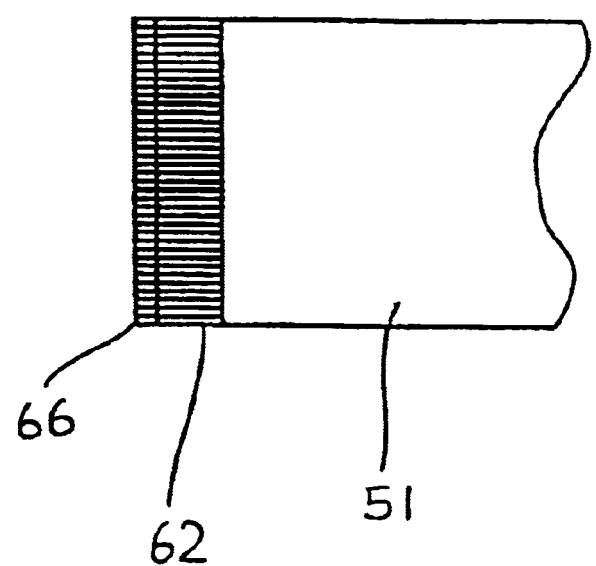
FIG. 13 is a partial cross section of a stator core in FIG. 12.

FIG. 12 is a perspective of a stator 65 of an automotive alternator according to Embodiment 3 of the present invention, and FIG. 13 is a partial cross section of a stator core 67 in FIG. 12.

Embodiment 3 differs from Embodiment 2 in that an outer circumferential core portion 66 of the stator 65 is constructed by laminating annular plate-shaped members and integrating them by laser welding.

Because the outer circumferential core portion 66 in Embodiment 3 has a laminated construction, the occurrence of eddy currents at surfaces of the outer circumferential core portion 66 can be suppressed, improving magnetic performance while achieving the effects in Embodiment 2.

Figure 14:
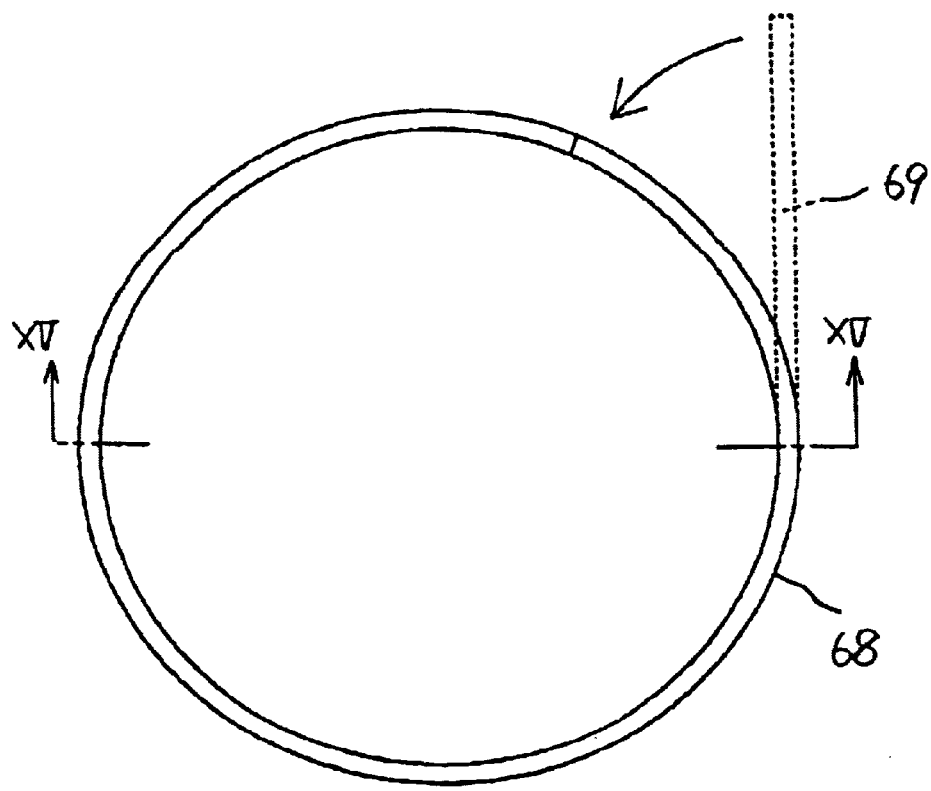
FIG. 14 is a diagram explaining an intermediate step of the manufacturing process for an outer circumferential core portion.
Figure 15:
FIG. 15 is cross section of the outer circumferential core portion in FIG. 14 taken along line XV—XV.

Moreover, the outer circumferential core portion 66 is constructed by laminating a number of sheets of annular plate-shaped members, but as shown in FIGS. 14 and 15, the stator core 67 may also be manufactured by forming an outer circumferential core portion 68 by winding a long plate-shaped magnetic member 69 into a spiral shape and fitting the outer circumferential core portion 68 onto the outside of an inner circumferential core portion (not shown). In that case, the manufacture of the stator core 67 is made proportionately easier by the elimination of the need for a punching process.

Embodiment 4

Figure 16:
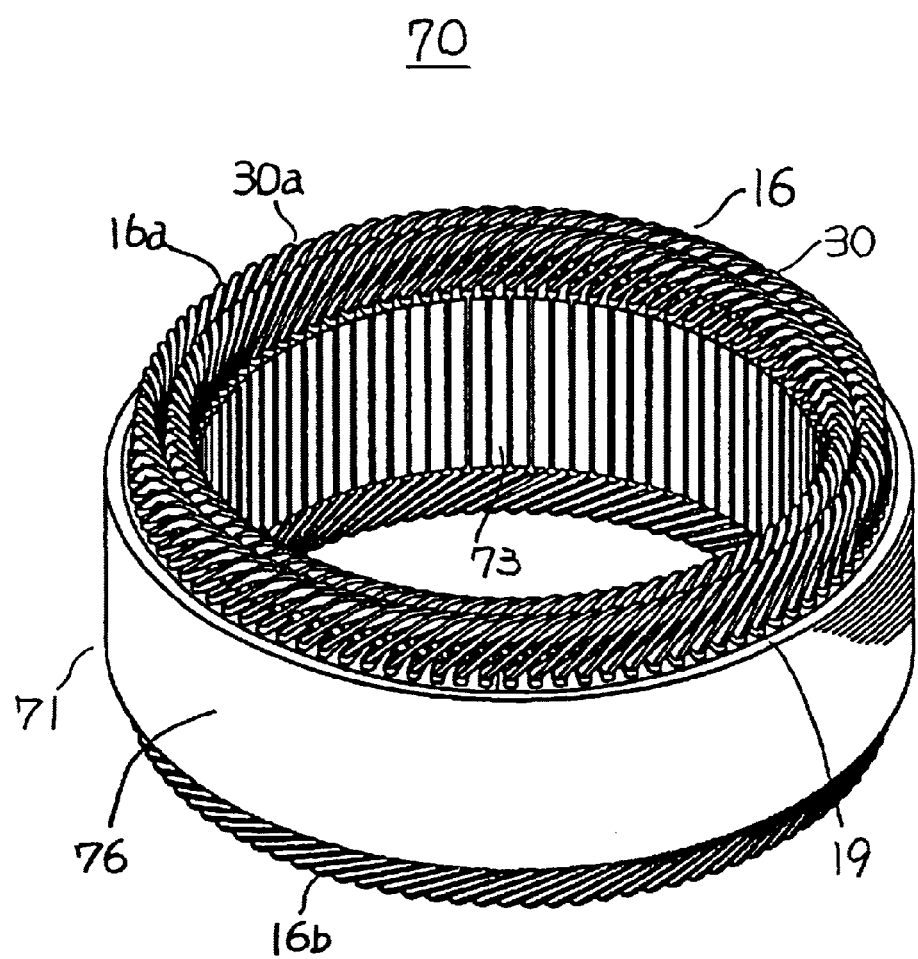
FIG. 16 is a perspective of a stator of an automotive alternator according to Embodiment 4 of the present invention.
Figure 17:
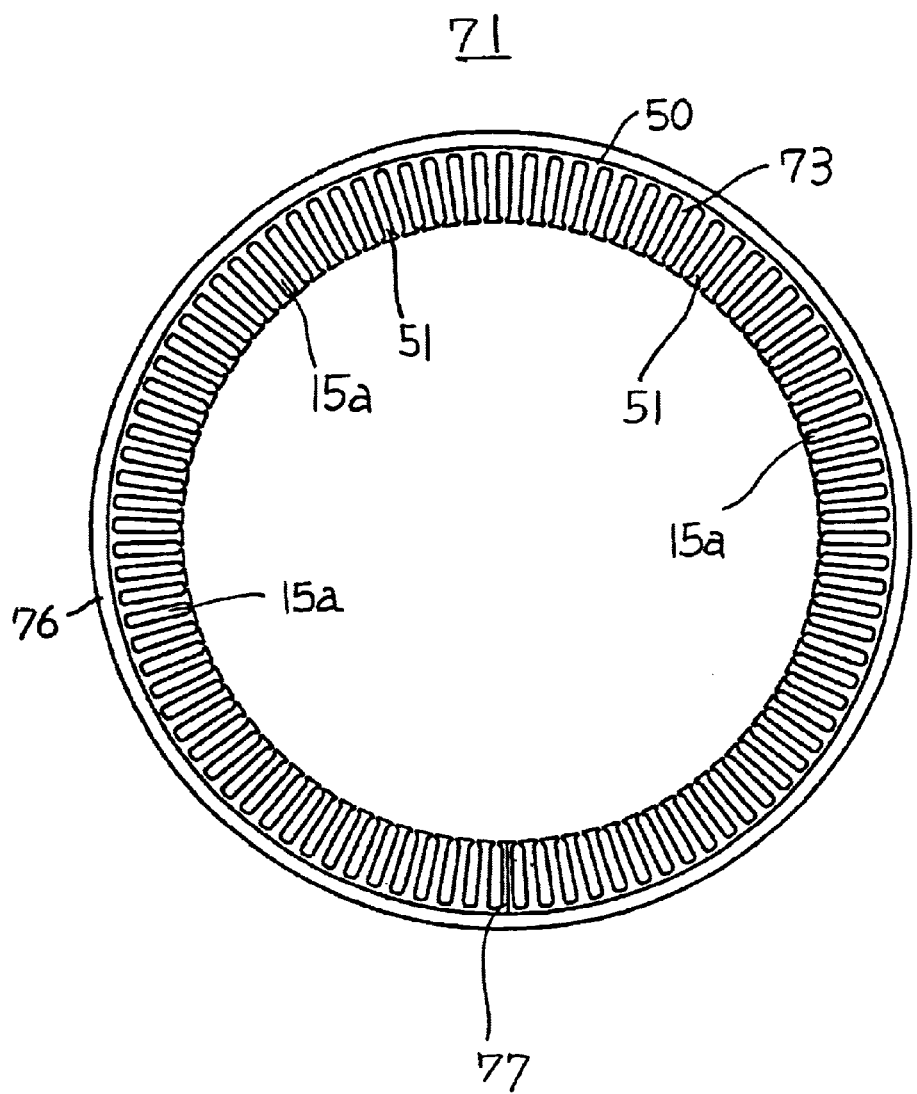
FIG. 17 is a cross section of a stator core in FIG. 16.
Figure 18:
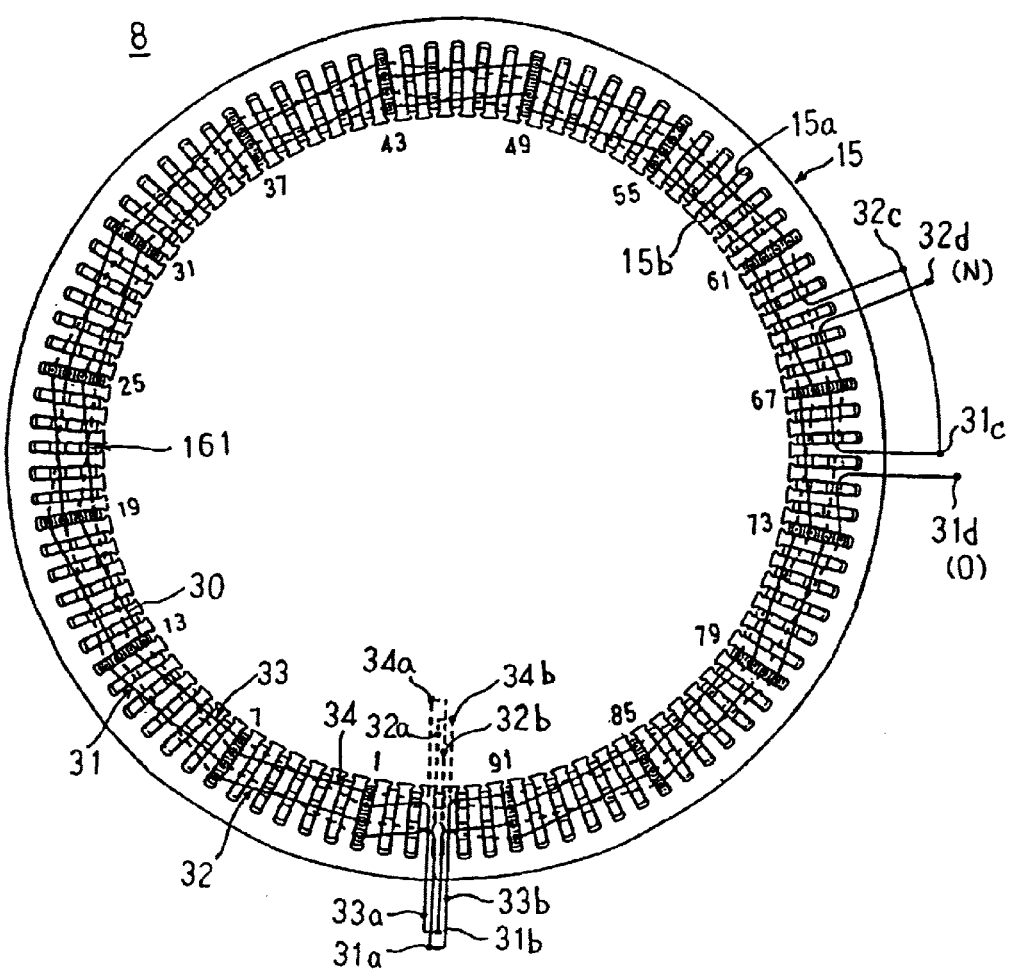
FIG. 18 is a diagram explaining connections in one phase of stator winding group in FIG. 16.
Figure 19:
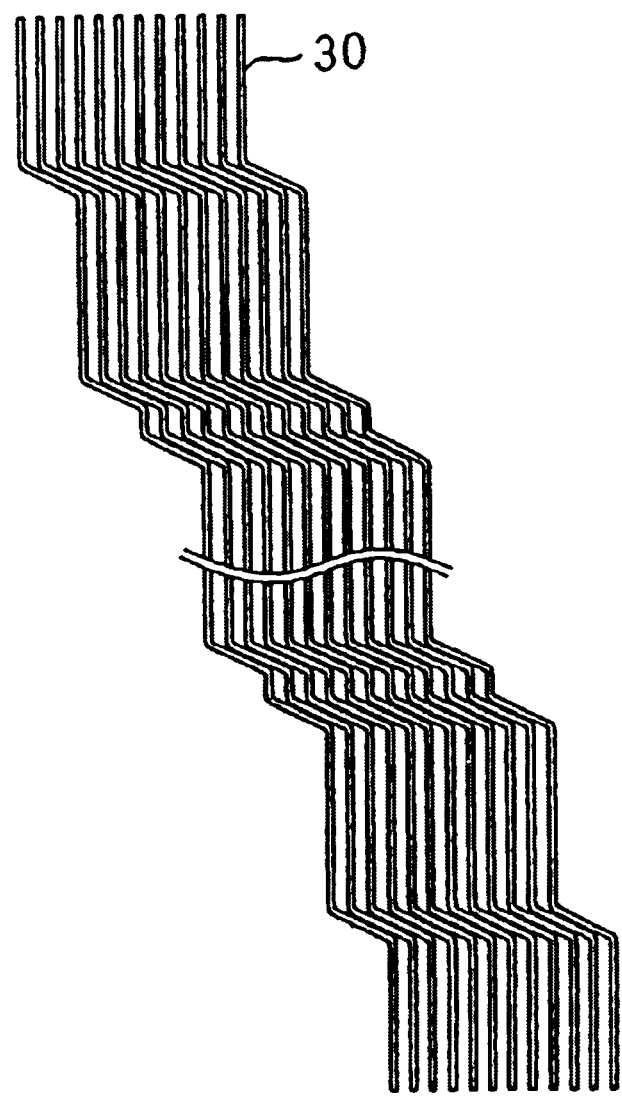
FIG. 19 is a diagram explaining the manufacturing process for winding groups constituting part of the stator winding used in the automotive alternator according to Embodiment 4 of the present invention.
Figure 20:
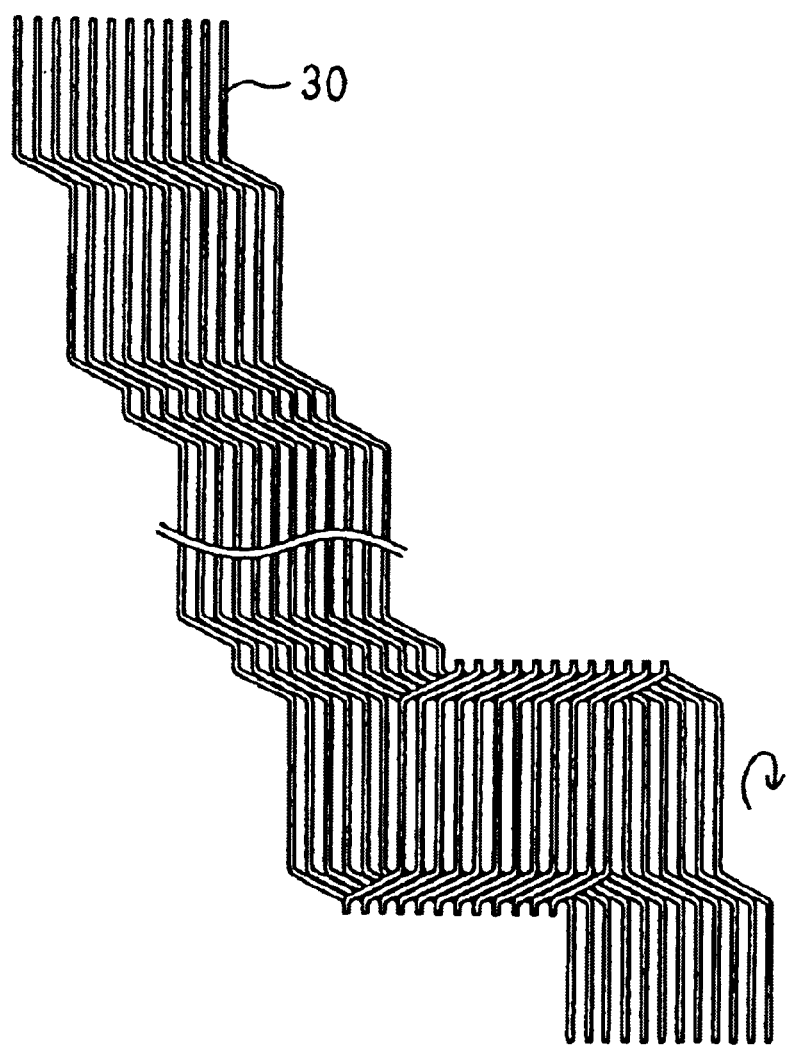
FIG. 20 is a diagram explaining the manufacturing process for winding groups constituting part of the stator winding used in the automotive alternator according to Embodiment 4 of the present invention.
Figure 21:
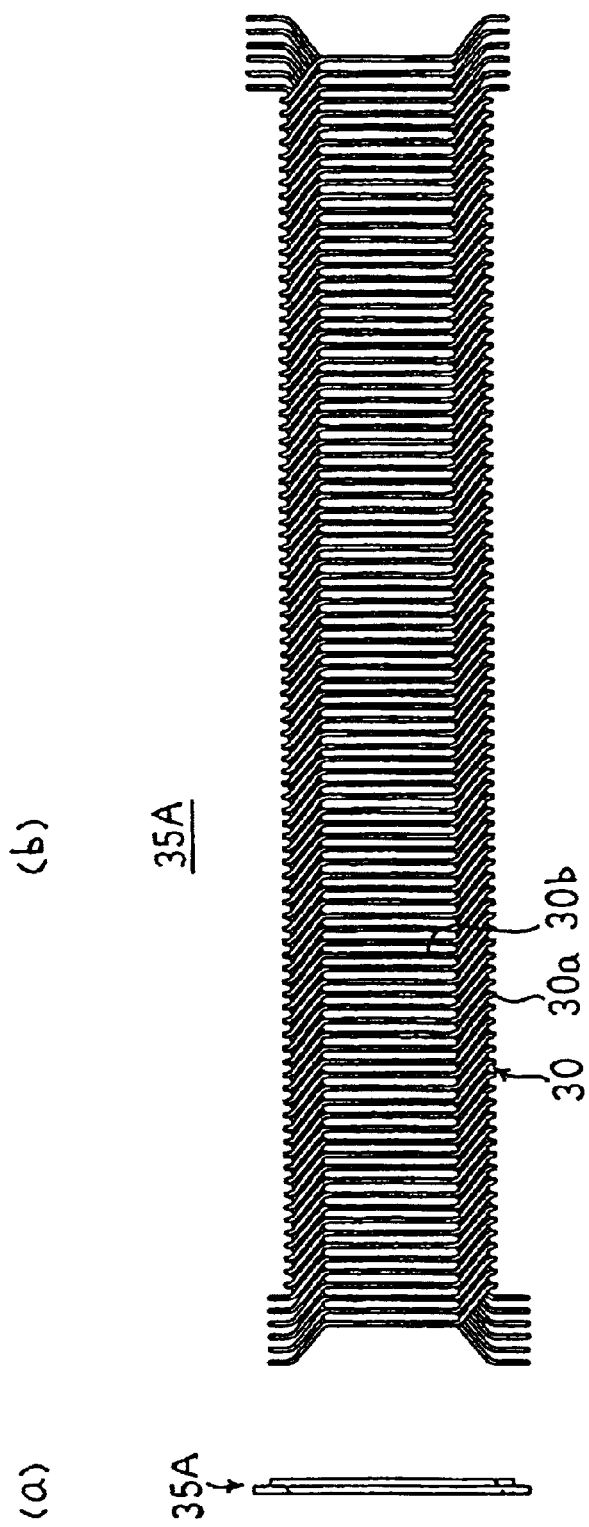
FIGS. 21(a) and 21(b) are an end elevation and a plan, respectively, showing an inner layer wire-strand group constituting part of the stator winding used in the automotive alternator according to Embodiment 4 of the present invention.
Figure 22:
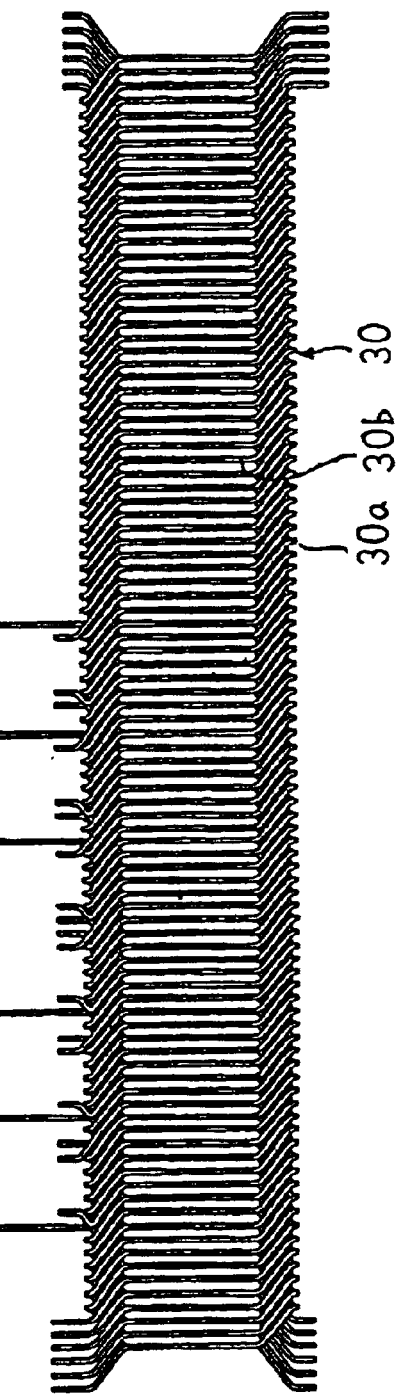
FIGS. 22(a) and 22(b) are an end elevation and a plan, respectively, showing an outer layer wire-strand group constituting part of the stator winding used in the automotive alternator according to Embodiment 4 of the present invention.
Figure 24:
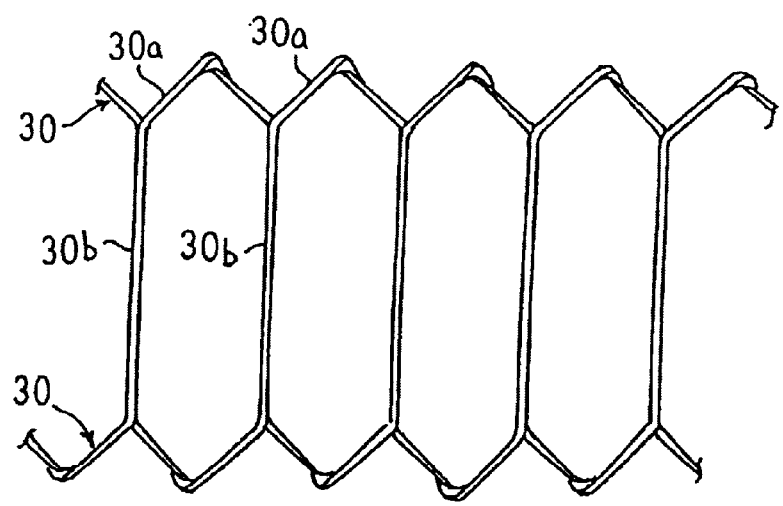
FIG. 24 is a diagram explaining arrangement of the strands of wire constituting part of the stator winding used in the automotive alternator according to Embodiment 4 of the present invention.
Figure 23:
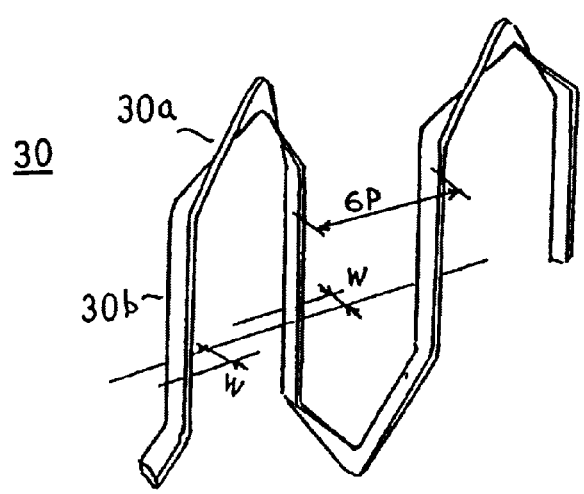
FIG. 23 is a perspective showing part of a strand of wire constituting part of the stator winding used in the automotive alternator according to Embodiment 4 of the present invention.

FIG. 16 is a perspective of a stator 70 of an automotive alternator according to Embodiment 4 of the present invention, FIG. 17 is a cross section of a stator core 71 in FIG. 16, FIG. 18 is a diagram explaining connections in one phase of stator winding group in FIG. 16, FIGS. 19 and 20 are diagrams explaining the manufacturing process for winding groups constituting part of the stator winding, FIGS. 21(a) and 21(b) are diagrams showing an inner layer wire-strand group constituting part of the stator winding in FIG. 16, FIG. 21(a) being an end elevation and FIG. 21(b) being a plan, FIGS. 22(a) and 22(b) are diagrams showing an outer layer wire-strand group constituting part of the stator winding in FIG. 16, FIG. 22(a) being an end elevation and FIG. 22(b) being a plan, FIG. 23 is a perspective showing part of a strand of wire constituting part of the stator winding in FIG. 16, and FIG. 24 is a diagram explaining arrangement of the strands of wire constituting part of the stator winding in FIG. 16.

In the automotive alternator according to Embodiment 4 of the present invention, as shown in FIG. 16, the stator 70 includes: a cylindrical stator core 71 composed of a laminated core formed with a number of slots 15a extending axially at a predetermined pitch in a circumferential direction; a polyphase stator winding 16 wound onto the stator core 71; and insulators 19 installed in each of the slots 15a for electrically insulating the polyphase stator winding 16 from the stator core 71.

The stator core 71 includes: an inner circumferential core portion 73; and a cylindrical outer circumferential core portion 76 press fitted over the inner circumferential core portion 73. The outer circumferential core portion 76 is formed by laminating a number of layers of SPCC material and integrating them by laser welding. Moreover, as explained in FIGS. 14 and 15, the outer circumferential core portion 76 may also be constructed by winding a magnetic member into a spiral shape, or it may also be a pipe shape.

Next, the winding construction of one phase of stator winding group 161 will be explained in detail with reference to FIG. 18. Embodiment 1 was a four-turn aggregated winding, but the winding construction of Embodiment 4 differs in that the divided into parts.

One phase of stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 71, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 71, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut A first cut end 31c of the first winding sub-portion 31 and a first cut end 32c of the second winding sub-portion 32 are joined to form one phase of stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection joint portion, a second cut end 31d of the first winding sub-portion 31 and a second cut end 32d of the second winding sub-portion 32 become an lead wire (O) and a neutral-point lead wire (N), respectively.

A total of six phases of stator winding groups 161 are similarly formed by offsetting the slots 15a into which the strands of wire 30 are wound one slot at a time. Then, as shown in FIG. 4, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Next, the assembly of the stator 70 will be explained in detail.

First, as shown in FIG. 19, twelve long strands of wire 30 are simultaneously bent in the same plane to form a lightning-bolt shape. Then, a wire-strand group 35A, shown in FIGS. 21(a) and 21(b), is prepared by progressively folding the strand at right angles, as indicated by the arrow in FIG. 20, using a jig. In addition, a wire-strand group 35B including bridging connections and lead wires is prepared, as shown in FIGS. 22(a) and 22(b).

Moreover, as shown in FIG. 23, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 24. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

Figure 25:
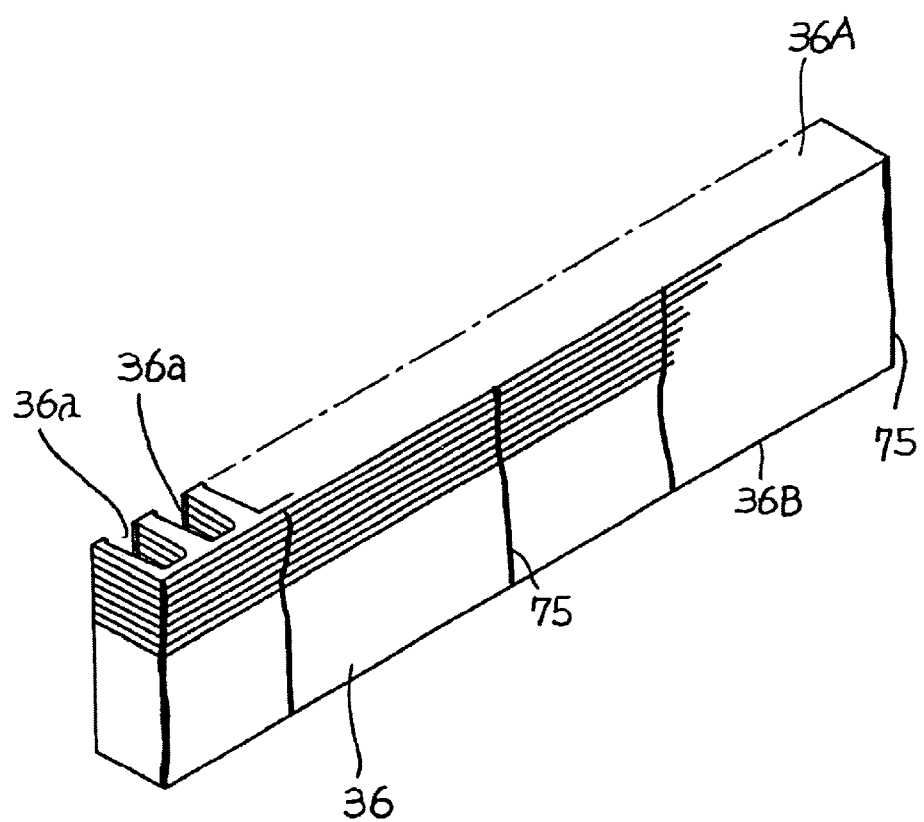
FIG. 25 is a perspective of the base core of the inner circumferential core portion in FIG. 17 before bending.

A parallelepiped base core 36 is prepared as shown in FIGS. 25(a) and 25(b) by laminating a predetermined number of sheets of SPCC material formed with trapezoidal slots 36a at a predetermined pitch (an electrical angle of 30°) and laser welding an outer portion thereof.

Figure 26:
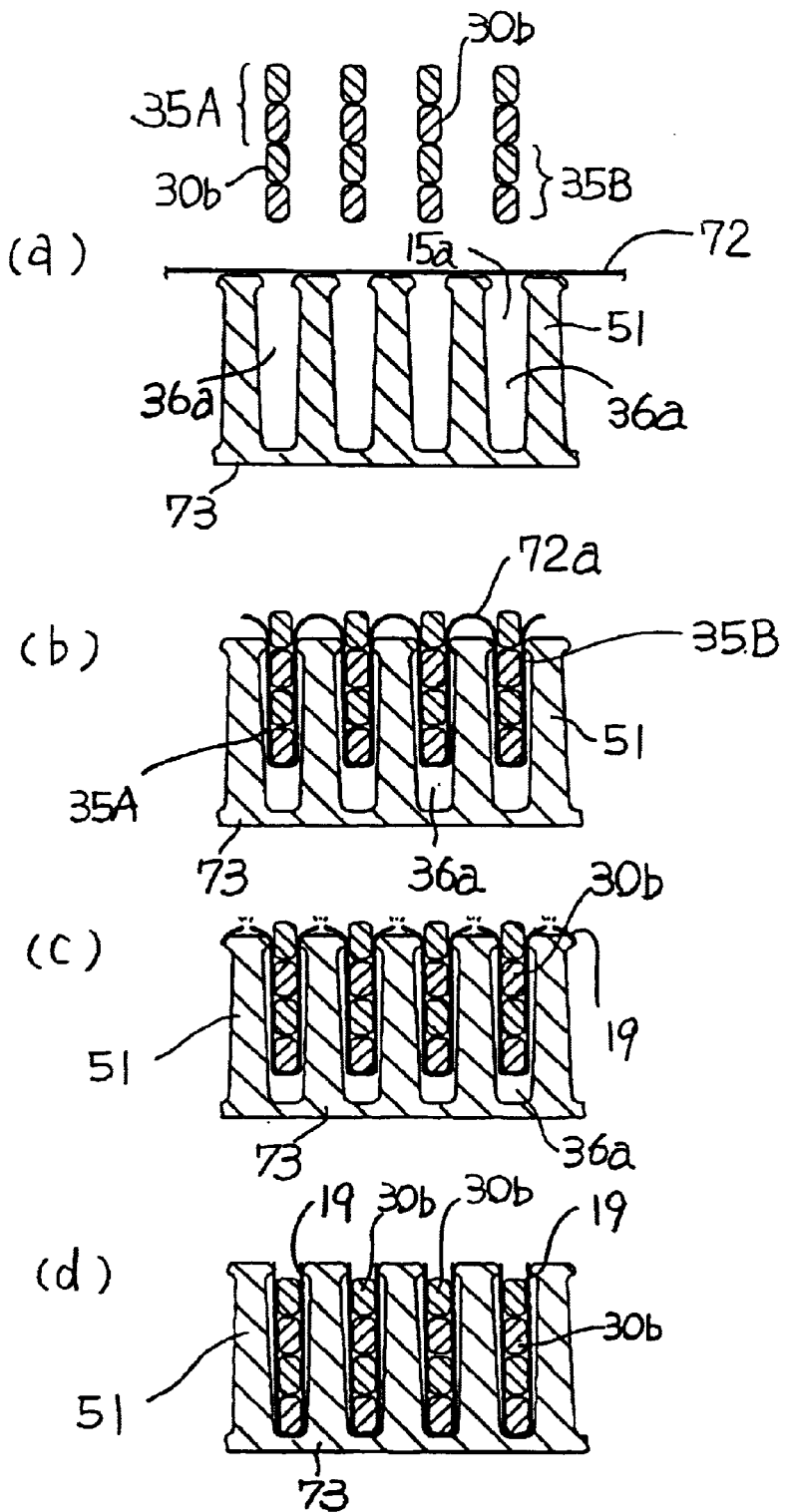
FIGS. 26(a) to (d) are diagrams explaining the steps of inserting the winding into the base core in FIG. 25.
Figure 27:
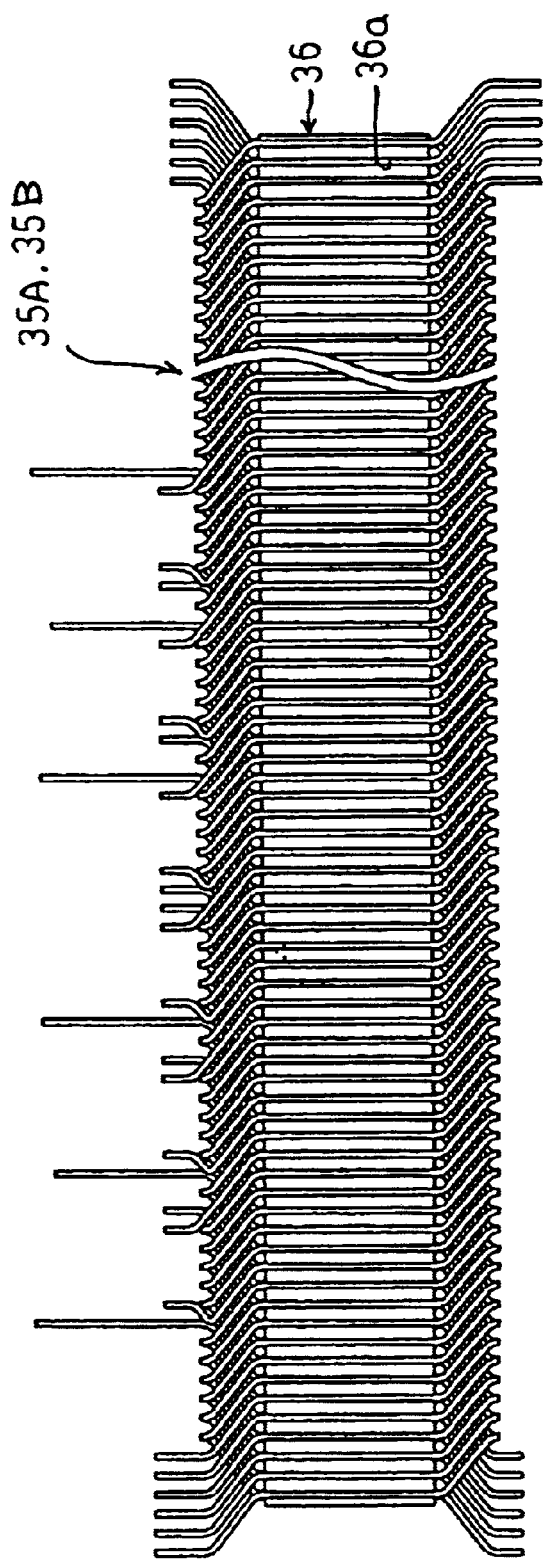
FIG. 27 is a plan showing a wire-strand group constituting part of the stator winding in FIG. 16 installed in the core.

As shown in FIG. 26(a), a strip of base insulators 72 is placed on top of the slots 36a of the base core 36, and then, as shown in FIGS. 26(b) to 26(d), the straight portions 30b of the two wire-strand groups 35A and 35B are inserted into each of the slots 36a. During this insertion, joining portions 72a of the base insulators 72 between the slots 36a are cut, thus forming the insulators 19, and then the straight portions 30b of the two wire-strand groups 35A and 35B are housed such that four of the straight portions 30b line up within each of the slots 36a and are insulated from the base core 36 by the insulators 19. FIG. 27 shows a plan of the whole stator core at this stage.

Figure 28:
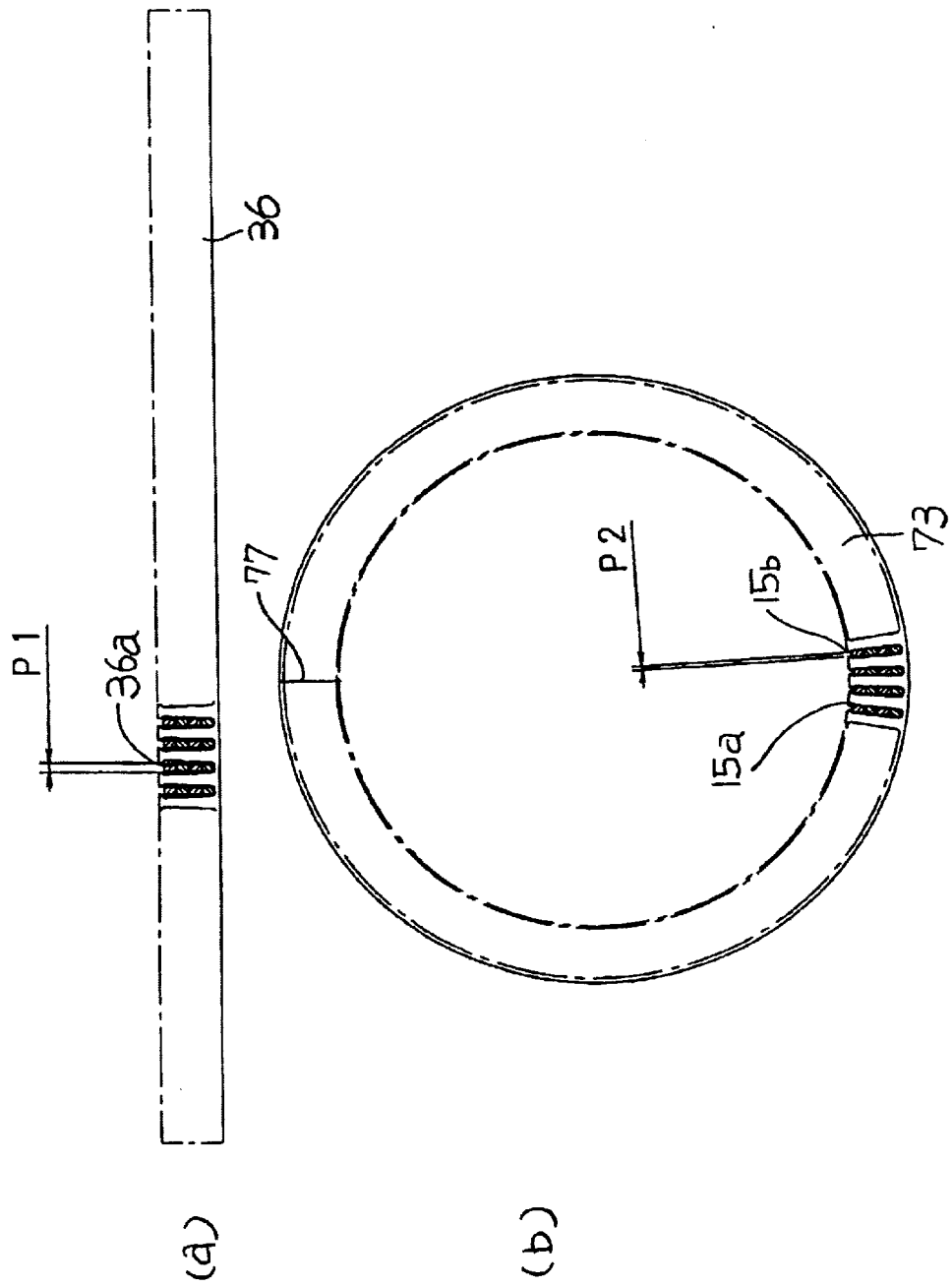
FIGS. 28(a) and (b) are diagrams explaining the bending process for the inner circumferential core portion in FIG. 17.

Next as shown in FIG. 28(a), the parallelepiped base core 36 with the wire-strand groups 35A and 35B inserted is rolled up into a cylindrical shape, and its ends abutted and welded to each other to form an abutting portion 77, and a cylindrical inner circumferential core portion 73 is obtained, as shown in FIG. 28(b). At this time, a width P2 of the opening portions 15b of the slots 15a of the inner circumferential core portion 73 is smaller than a width P1 of the slots 36a of the parallelepiped base core 36. Moreover, before bending the parallelepiped base core 36, the base core 36 is prepared by first bending the ends only so that when the ends of the base core 36 are abutted, good roundness is achieved in the inner circumferential core portion 73 even at the contacting portions.

Figure 29:
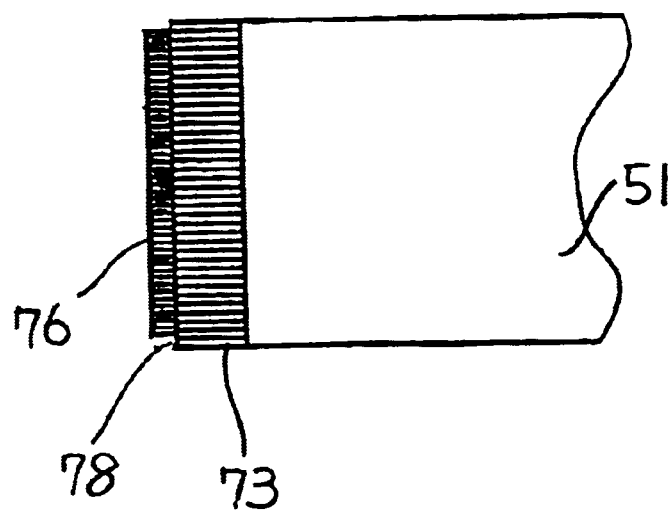
FIG. 29 is a partial cross section of the stator core in FIG. 17.

The end portions of each of the strands of wire 30 are connected to form the stator winding groups 161, based on the connections shown in FIG. 18. Then, the cylindrical outer circumferential core portion 76 which is composed of a number of layers of laminated SPCC material integrated by laser welding is press fitted over the inner circumferential core portion 73 to obtain the stator 70. Moreover, as shown in FIG. 29, axial dimensions of the outer circumferential core portion 76 are smaller than axial dimensions of the inner circumferential core portion 73 to form stepped portions 78 on both outer circumferential edge portions of the stator core 71.

Since the thickness of the plates in the outer circumferential core portion 76 is 0.15 mm, and the thickness of the plates in the inner circumferential core portion 73 is 0.35 mm, the thickness of the plates in the outer circumferential core portion 76 is smaller than the thickness of the plates in the inner circumferential core portion 73.

According to Embodiment 4, the operation of assembling the stator winding 70 is greatly improved compared to the conventional art, in which a large number of conductor segments 305 are inserted into the slots one at a time, by rolling the parallelepiped base core 36 into a cylindrical shape with the straight portions 30b of the two wire-strand groups 35A and 35B housed in the slots 36a of the base core 36, and abutting the ends of the base core 36 and welding them to each other.

The rigidity of the stator core 71 is increased by forming the inner circumferential core portion 73 by bending the base core 36 into a cylindrical shape and then press fitting the inner circumferential core portion 73 into the outer circumferential core portion 76. Before the inner circumferential core portion 73 is inserted into the outer circumferential core portion 76, outside diameter dimensions of the inner circumferential core portion 73 are slightly larger than inside diameter dimensions of the outer circumferential core portion 76 so that the shape of the inner circumferential core portion 73 is restricted by the outer circumferential core portion 76 during press fitting of the outer circumferential core portion 76, enabling the degree of roundness of the inner circumferential core portion 73 to be increased.

Because the abutting portion 77 is disposed inside a tooth 51, the parallelepiped base core 36 can be rolled into a cylindrical shape with the straight portions 30b of the two wire-strand groups 35A and 35B housed in the slots 36a of the base core 36, and can be joined by welding without damaging the strands of wire 30 in the two wire-strand groups 35A and 356 during the welding operation.

In this embodiment, since radial thickness of the inner circumferential core portion 73 (constituting part of the core back 50 of the stator core 71) is smaller than radial thickness of the outer circumferential core portion 76 (also constituting part of the core back 60 of the stator core 71), the base core 36 can be reliably made into a cylinder. The rigidity of this inner circumferential core portion 73 is increased by the outer circumferential core portion 76, and the inner circumferential core portion 73 is firmly joined at the abutting portion 77, enabling magnetic passage resistance to be kept to a minimum at the abutting portion 77.

Moreover, the main magnetic passage in the circumferential direction of the stator core 71 is on the inside of the stator core 71 dose to the rotor 7 which is a magnetic field source, and by making the thickness of the core back portion of the inner circumferential core portion larger than the thickness of the core back portion of the outer circumferential core portion, the magnetic passage is situated mainly in the inner circumferential core portion, minimizing the effects of magnetic resistance as a result of gaps between the outer circumferential surface of the inner circumferential core portion and the inner circumferential surface of the outer circumferential core portion.

Since the slots 36a of the base core 36 are trapezoidal, widening towards the opening portions, and circumferential width dimensions of the slots 15a between the teeth 51 of the stator 70 are generally the same as the circumferential dimensions of the straight portions 30b, the straight portions 30b of the two wire-strand groups 35A and 35B do not interfere with the tooth ends and can be inserted smoothly, and the teeth 51 and straight portions 30b are prevented from pressing on and deforming each other during bending of the base core 36.

Both axial end surfaces 36A and 36B of the base core are easily buckled as a result of warping of the SPCC material during bending of the base core 36, but in this embodiment, the many layers of SPCC material are firmly integrated by weld portions 75 extending axially at a number of locations, increasing the rigidity of the base core 36 and suppressing buckling. Moreover, these weld portions 75 do not have to be evenly spaced, and they may also be divided in the axial direction.

In the above embodiment, stepped portions 78 are formed on both outer circumferential edge portions of the stator core 71, and these stepped portions 78 can be engaged in end surfaces of the front bracket 1 and the rear bracket 2.

Furthermore, since the thickness of the plates in the outer circumferential core portion 76 is 0.15 mm, and the thickness of the plates in the inner circumferential core portion 73 is 0.35 mm, the outer circumferential core portion 76 is formed by laminating steel material having a thin plate thickness, suppressing the generation of eddy currents in the outer circumferential core portion 76 and improving the output of the alternator.

Embodiment 5

Figure 30:
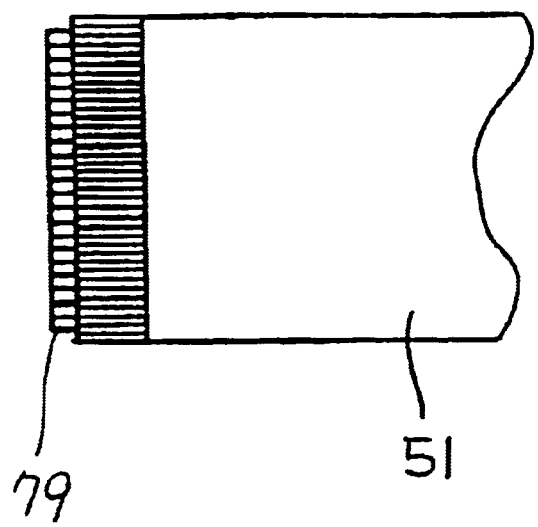
FIG. 30 is a partial cross section of a stator core used in an automotive alternator according to Embodiment 5 of the present invention.

FIG. 30 is a partial cross section of Embodiment 5 of the present invention. Embodiment 5 is the same as Embodiment 4 except for the fact that the thickness of the plates in an outer circumferential core portion 79 is 0.5 mm, increasing the thickness of the plates in the outer circumferential core portion from 0.15 mm to 0.5 mm. The rigidity of the outer circumferential core portion 79 is increased in proportion to the increase in the thickness of the plates, and at the abutting portion 77, the base core is joined more firmly, enabling magnetic passage resistance to be kept to even lower at the abutting portion 77.

Embodiment 6

Figure 31:
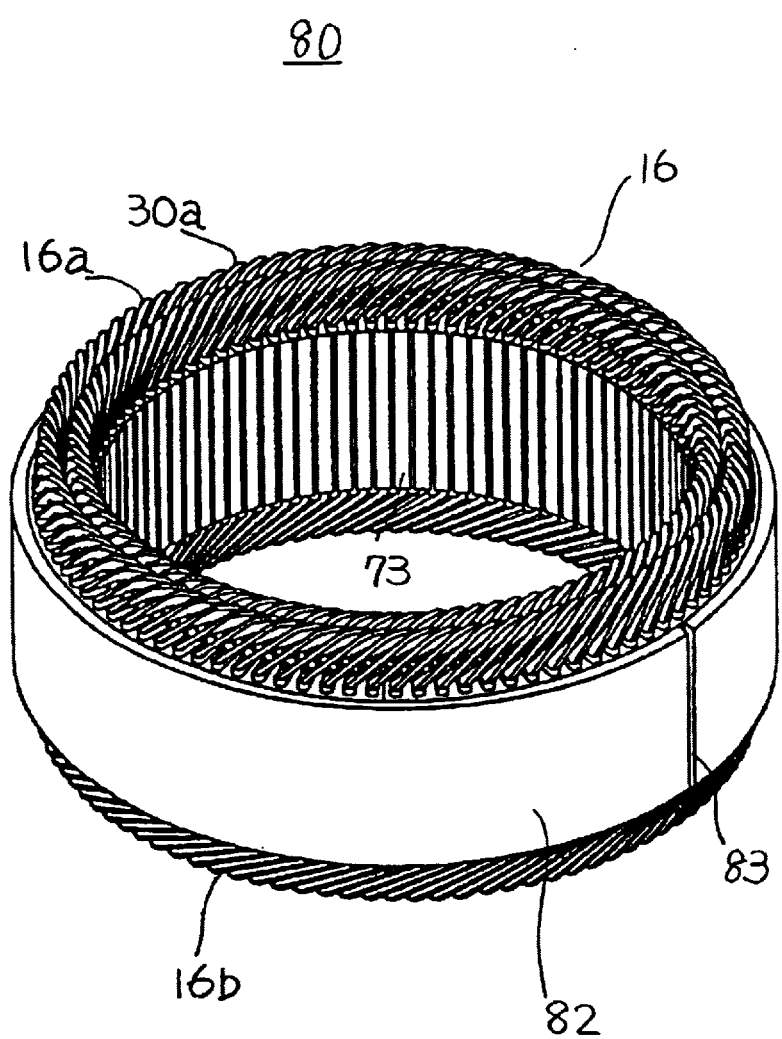
FIG. 31 is a total perspective of a stator used in an automotive alternator according to Embodiment 6 of the present invention.
Figure 32:
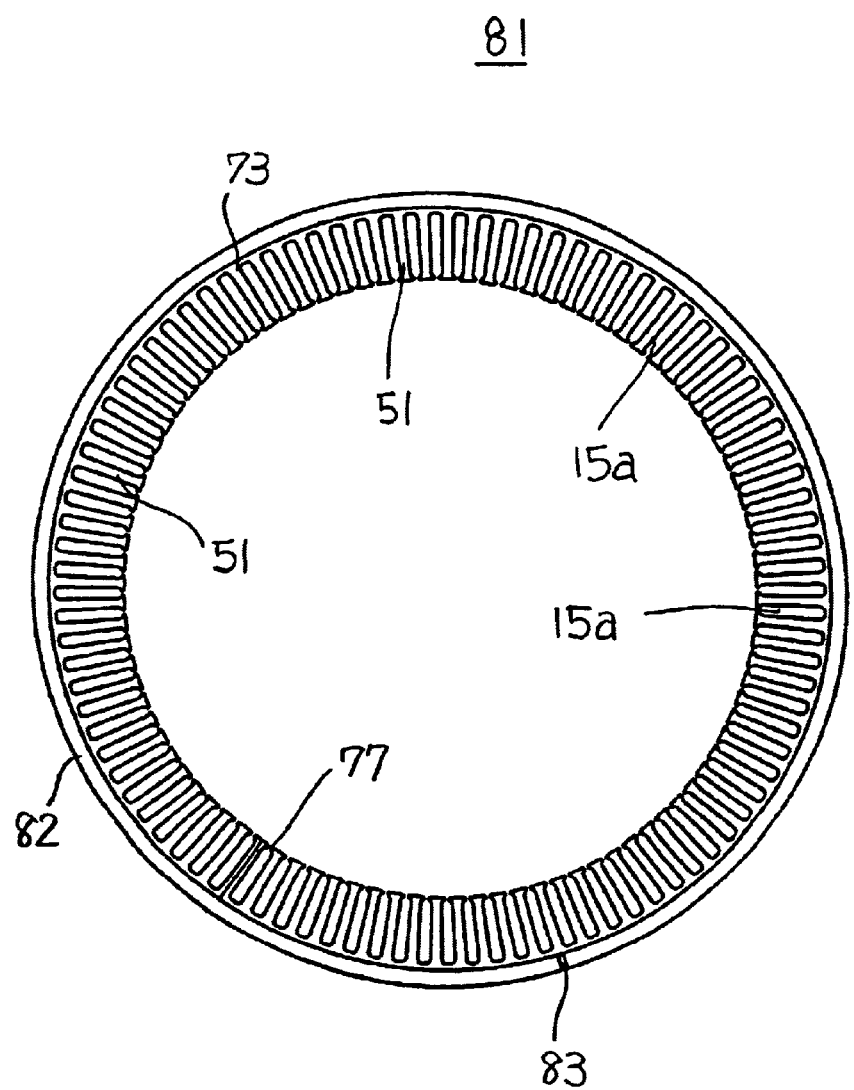
FIG. 32 is a cross section of a stator core in FIG. 31.

FIG. 31 is a total perspective of a stator 80 according to Embodiment 6 of the present invention, and FIG. 32 is a cross section of a stator core 81 of the stator 80 in FIG. 31. A separable split portion 83 extending radially is formed at one location in an outer circumferential core portion 82 of the stator core 81. In Embodiments 4 and 5, a cylindrical outer circumferential core portion 76 or 79 was press fitted over the outside of a cylindrical inner circumferential core portion 73, but in Embodiment 6, the inner circumferential core portion 73 and the outer circumferential core portion 82 are integrated by spreading the outer circumferential core portion 82 open at the split portion 83 and radially inserting the inner circumferential core portion 73, improving the assembly operation. After integration, the cylindrical shape of the inner circumferential core portion 73 is maintained by the elasticity of the outer circumferential core portion 82.

Embodiment 7

Figure 33:
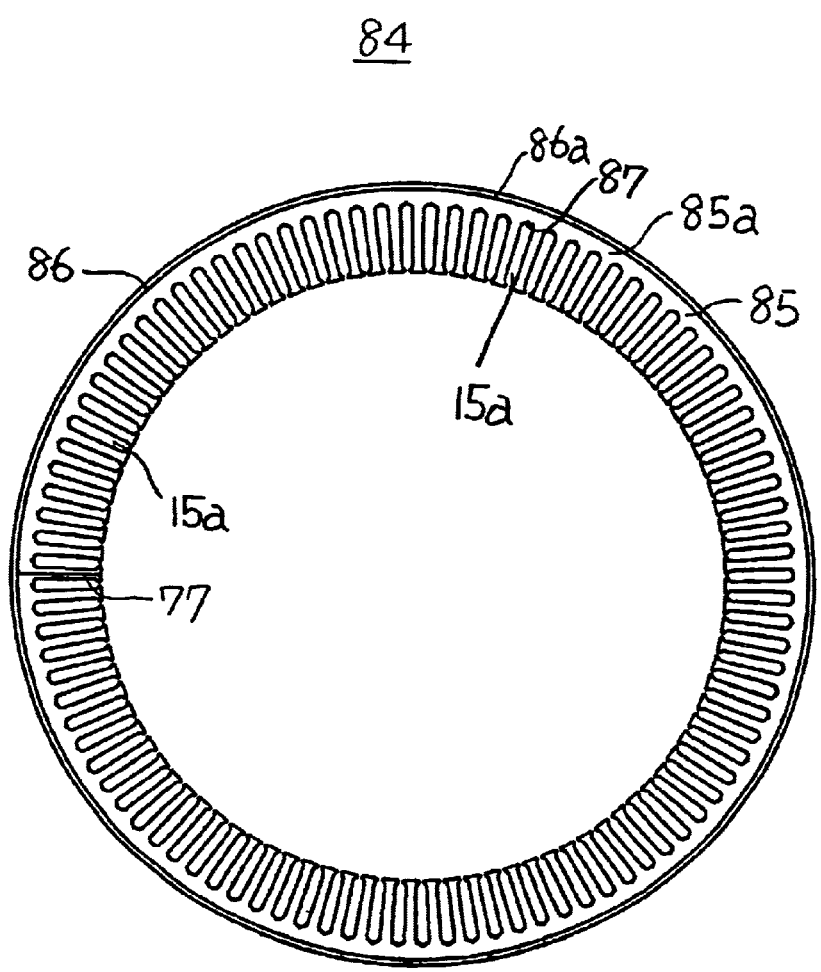
FIG. 33 is a cross section of a stator core used in an automotive alternator according to Embodiment 7 of the present invention.

FIG. 33 is a cross section of a stator core 84 according to Embodiment 7 of the present invention. This stator core 84 includes an inner circumferential core portion 85 in Which a radial dimension of a core back portion 85a is 2.6 mm, and an outer circumferential core portion 86 having a thickness of 1 mm. Notched portions 87 are formed in floor surfaces of the slots 15a of the inner circumferential core portion 85.

Figure 34:
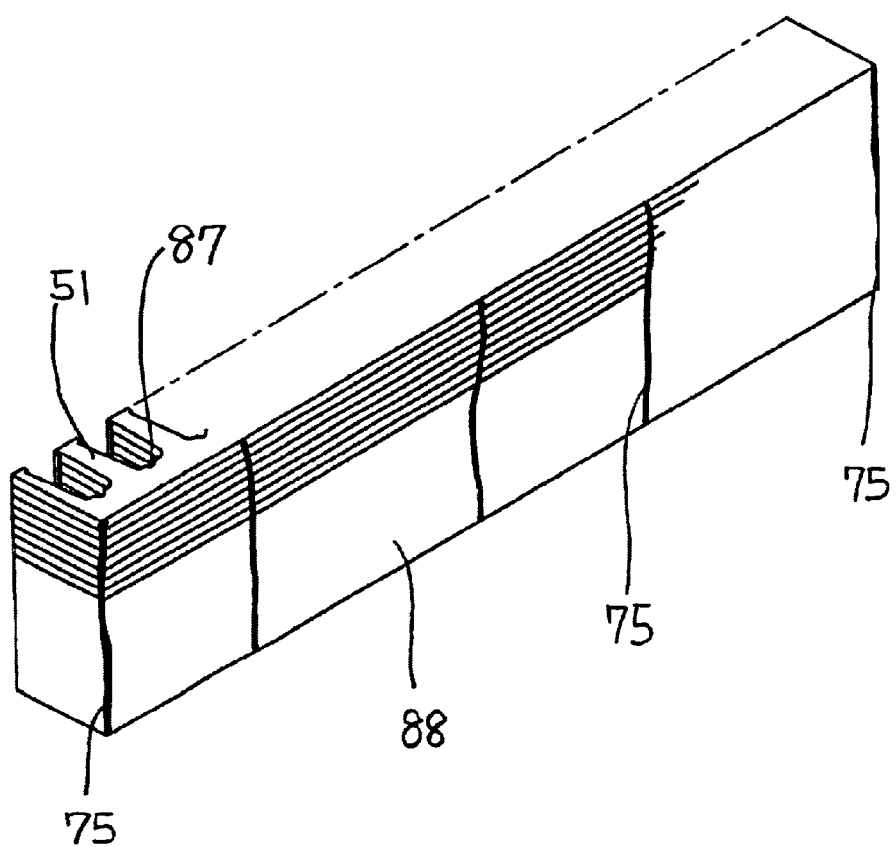
FIG. 34 is a perspective of a base core of an inner circumferential core portion in FIG. 33 before bending.

In this embodiment, the inner circumferential core portion 85 is formed by bending a base core 88 shown in FIG. 34 into a cylindrical shape. The thickness of a core back portion 85a of the inner circumferential core portion 85 is greater than the thickness of a core back portion 86a of the outer circumferential core portion 86 (the thickness of the outer circumferential core portion 86), requiring a large load for the bending deformation, but by providing the notched portions 87, the bending load is reduced. Moreover, the spaces formed by the notched portions 87 in the base core are dosed and eliminated as a result of the bending operation.

Embodiment 8

Figure 35:
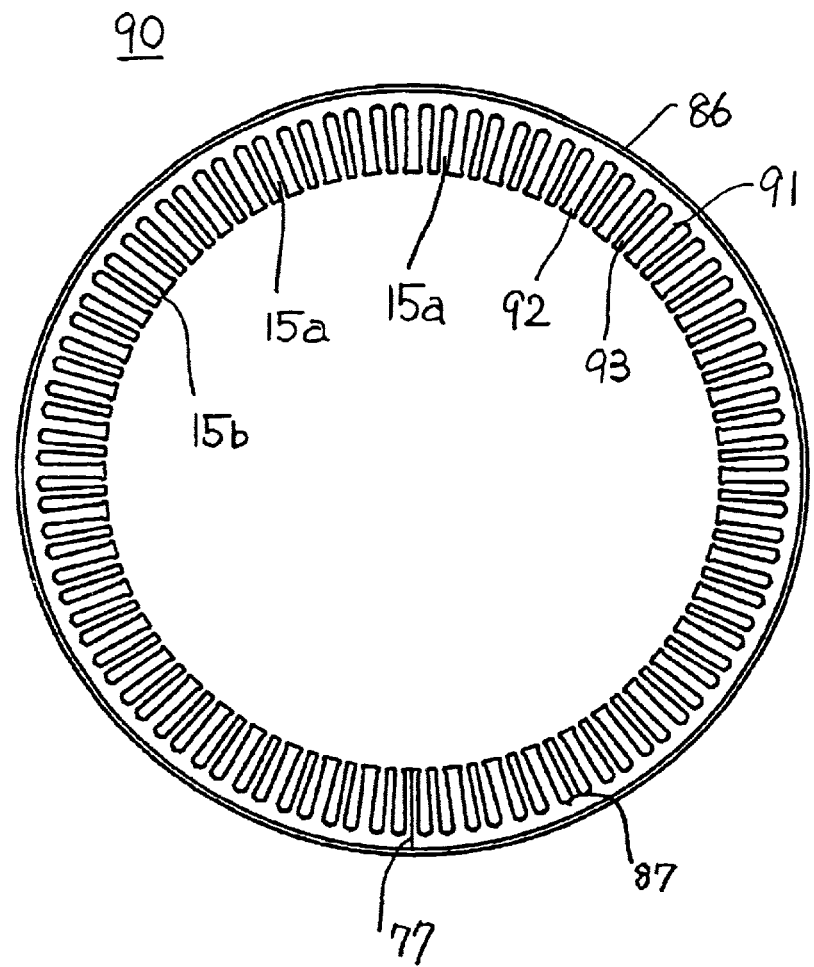
FIG. 35 is a cross section of a stator core used in an automotive alternator according to Embodiment 8 of the present invention.
Figure 36:
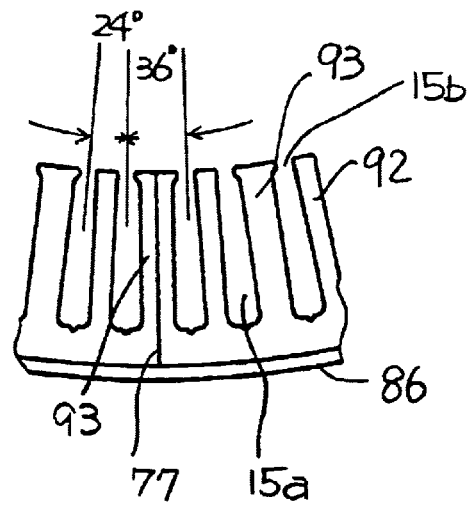
FIG. 36 is a partial enlargement of the stator core in FIG. 35.

FIG. 35 is a cross section of a stator core 90 according to Embodiment 8 of the present invention, and FIG. 36 is a partial enlargement of the stator core 90 in FIG. 35. In each of the above embodiments, the sets of winding groups were wound onto the stator core with a phase difference of 30° but in this embodiment, the sets of winding groups are wound onto the stator core 90 with a phase difference of 36°.

In Embodiment 8, teeth 92 and 93 in an inner circumferential core portion 91 alternate between different circumferential width dimensions, the pitch between center lines extending radially from adjacent opening portions 94 and 95 repeatedly alternating between an electrical angle of 24° and an electrical angle of 36°. Furthermore, the abutting portion 77 of the inner circumferential core portion 91 is disposed in one of the wide teeth 93.

Because the inner circumferential core portion 91 has teeth 92 and 93 having different circumferential width dimensions and the abutting portion 77 of the inner circumferential core portion 91 is disposed in one of the wide teeth 93, the rigidity of the teeth 93 is high even in the abutting portion 77, enabling the winding to be reliably installed in the slots. Furthermore, because the circumferential width dimensions are different the pitch between center lines extending radially from opening portions 15b of the slots 15 is uneven, reducing noise and fluctuations in the generated voltage.

Embodiment 9

Figure 37:
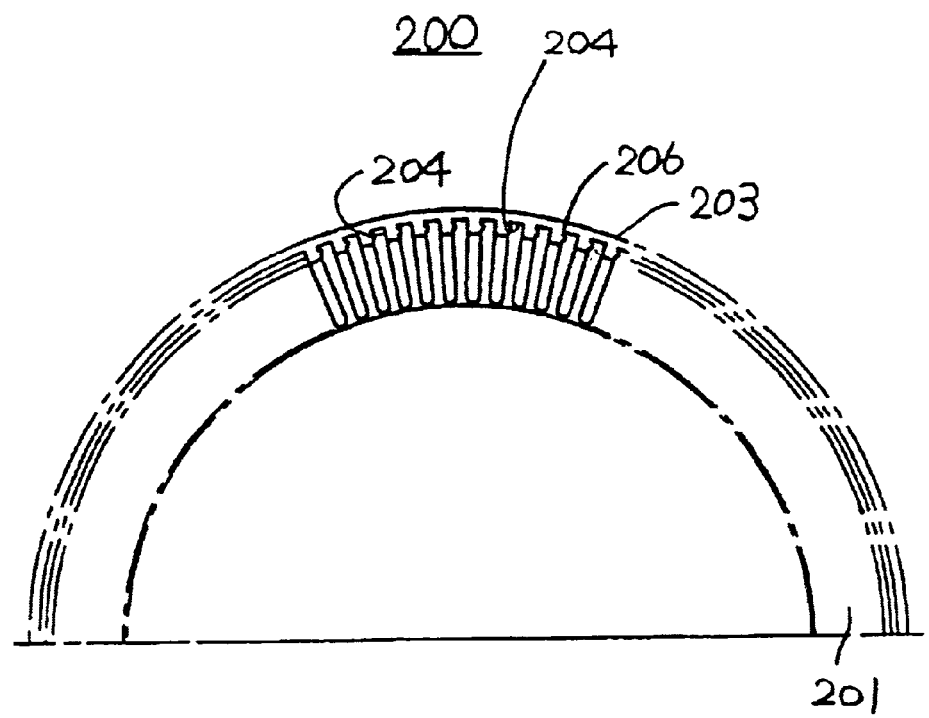
FIG. 37 is a partial cross section of a stator core used in an automotive alternator according to Embodiment 9 of the present invention.
Figure 38:
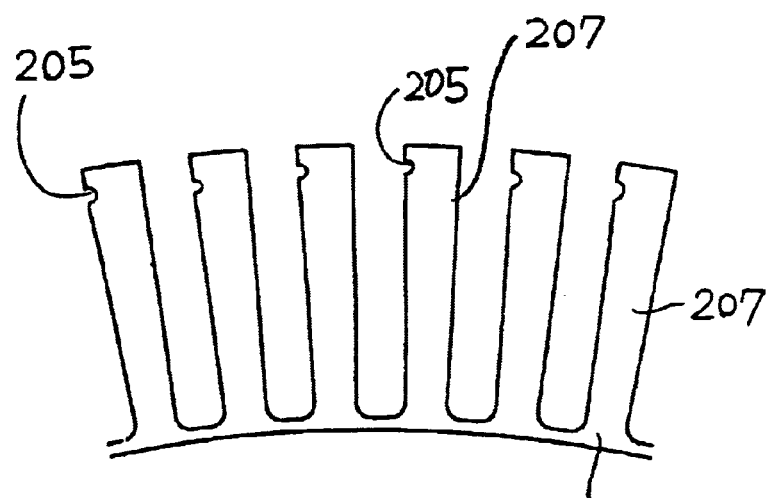
FIG. 38 is a partial enlargement of the stator core in FIG. 37.

FIG. 37 is a partial cross section of a stator core 200 according to Embodiment 9 of the present invention, and FIG. 38 is a partial enlargement of the stator core 200 in FIG. 37. Windings are omitted from the figures.

The stator core 200 according to Embodiment 9 of the present invention is composed of an inner circumferential core portion 201 divided into two parts, and a cylindrical outer circumferential core portion 203 surrounding the inner circumferential core portion 201. Groove portions 204 extending axially at even pitch in a circumferential direction are formed in an inner wall surface of the outer circumferential core portion 203. End portions of teeth 207 of the inner circumferential core portion 201 are inserted into these groove portions 204. Protrusions 206 are formed in the groove portions 204, and recesses 205 fitting into the protrusions 206 are formed on the end portions of the teeth 207.

In Embodiment 9, a stator winding (not shown) is mounted onto the inner circumferential core portion 201, then assembly of the stator is completed by inserting the outer circumferential core portion 203 into the inner circumferential core portion 201 from an axial direction so that the protrusions 206 are engaged in the recesses 205.

Unlike each of the other embodiments above, because this embodiment has dividing surfaces in a circumferential direction only, assembly is simplified. Moreover, in this embodiment, since end portions of adjacent teeth are joined at a radially inner portion, which may reduce output somewhat, the radially inner portions may be cut to form opening portions after assembly of the stator.

Embodiment 10

Figure 39:
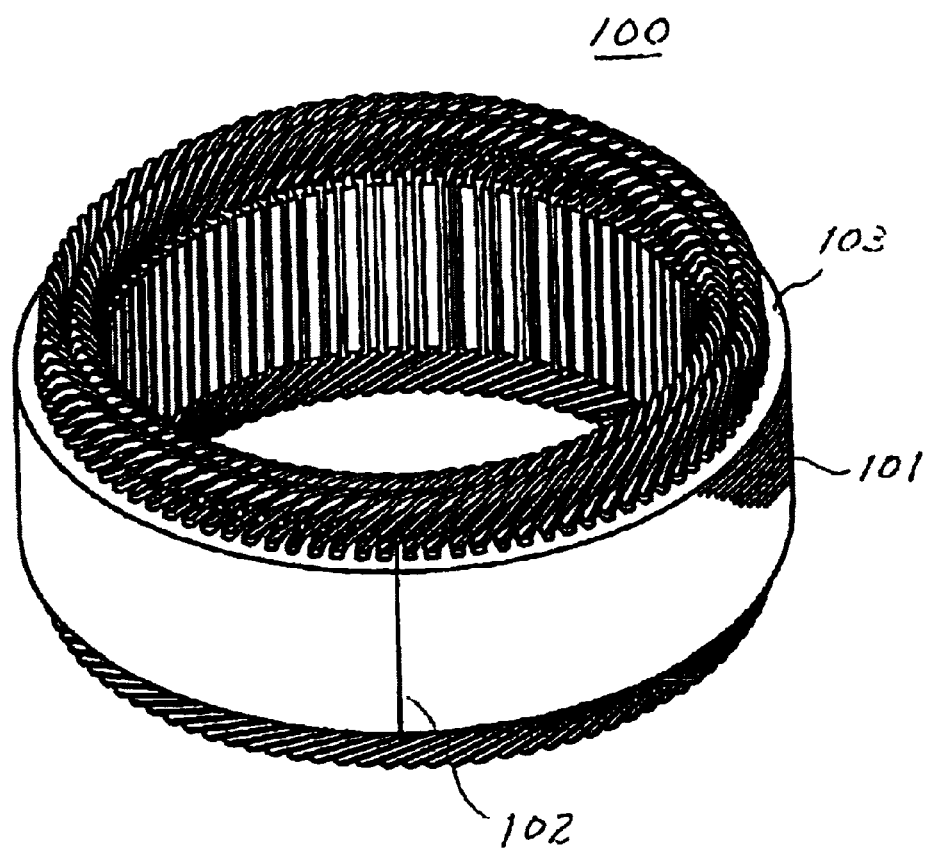
FIG. 39 is a perspective of a stator in an automotive alternator according to Embodiment 10 of the present invention.
Figure 40:
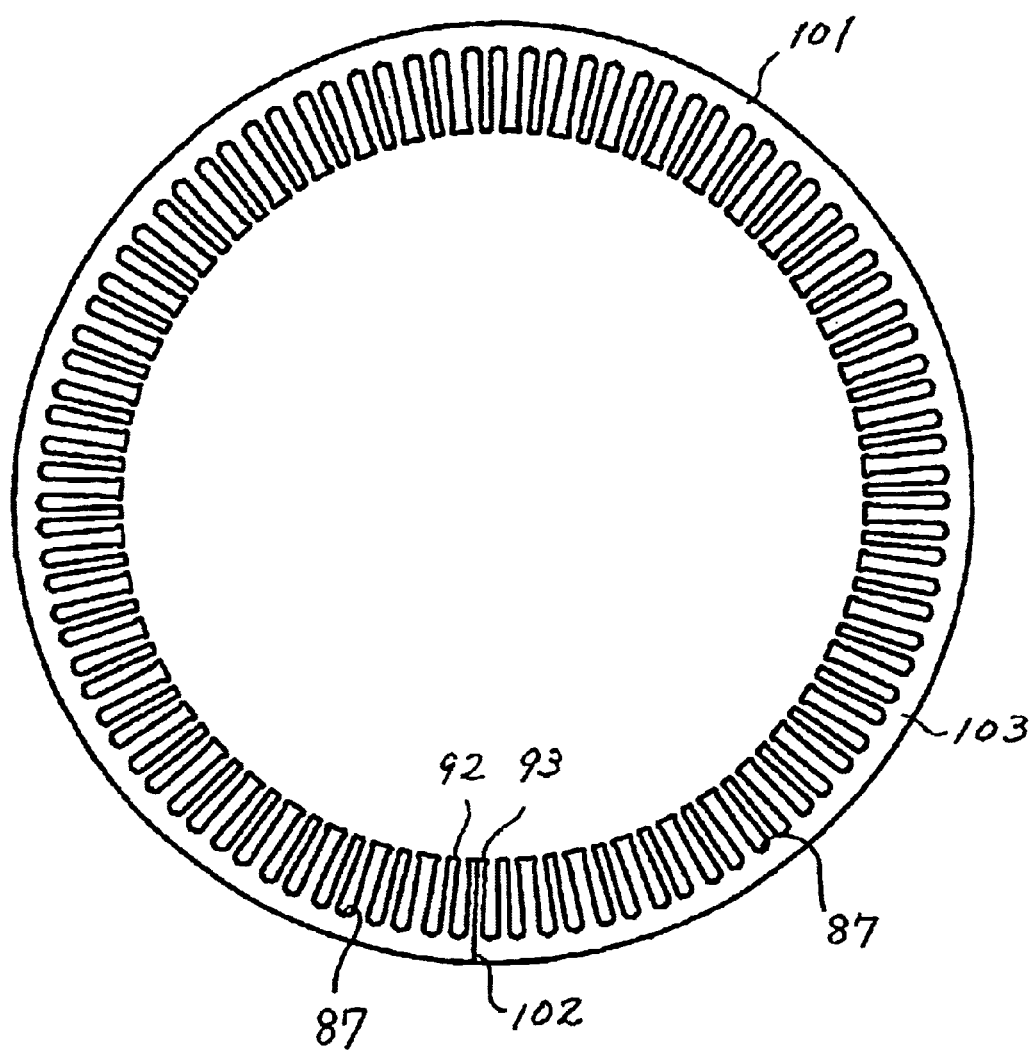
FIG. 40 is a cross section showing a stator core used in the stator in FIG. 39.
Figure 41:
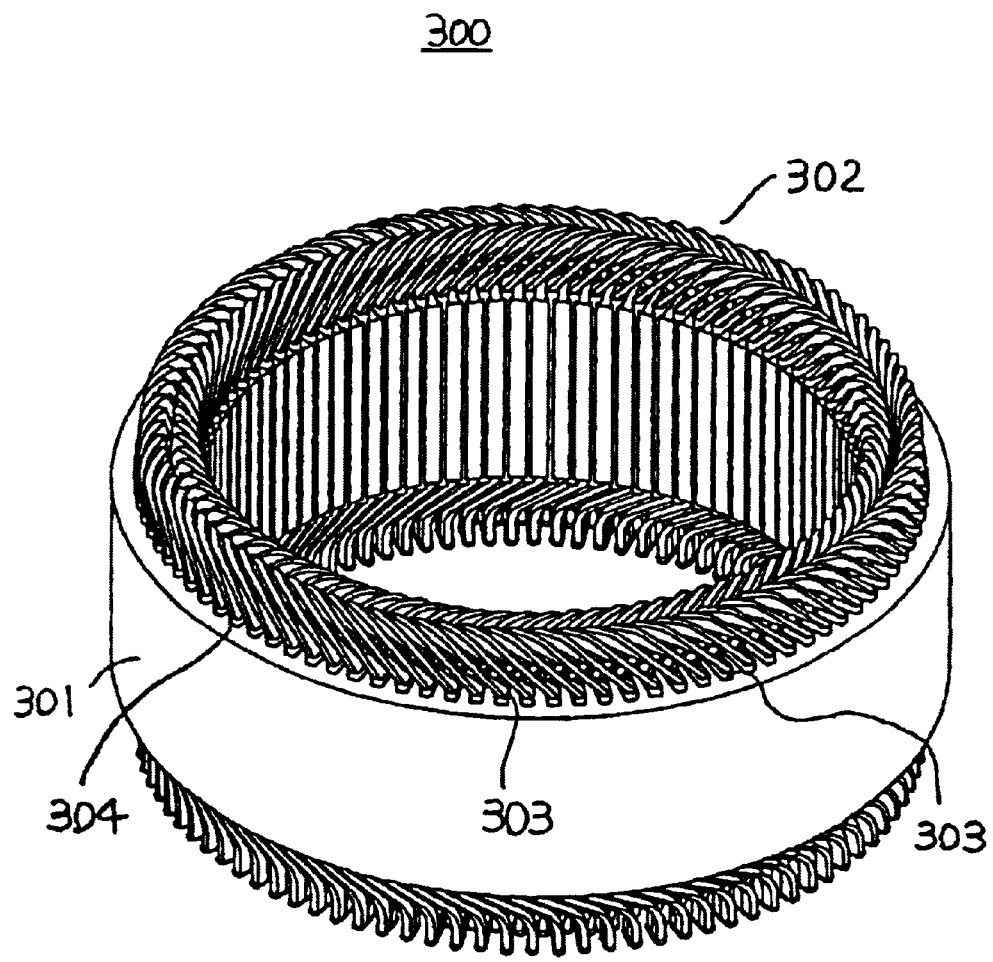
FIG. 41 is a perspective of a stator of a conventional automotive alternator.
Figure 42:
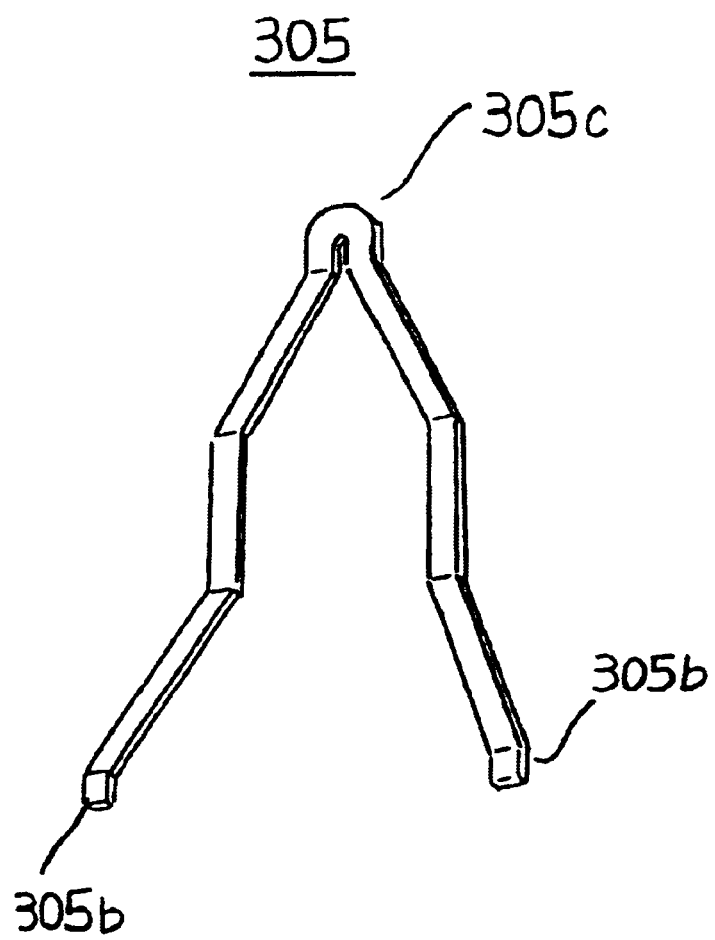
FIG. 42 is a perspective showing a conductor segment used in the stator in FIG. 41.
Figure 43:
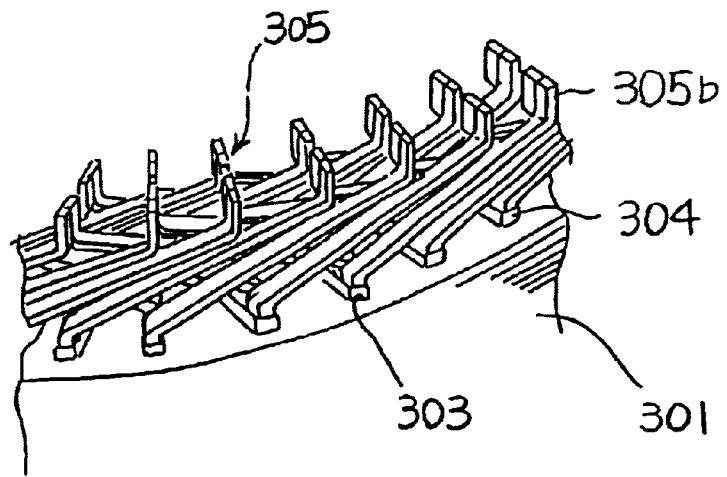
FIG. 43 is a perspective from a front end of part of the stator in FIG. 41.
Figure 44:
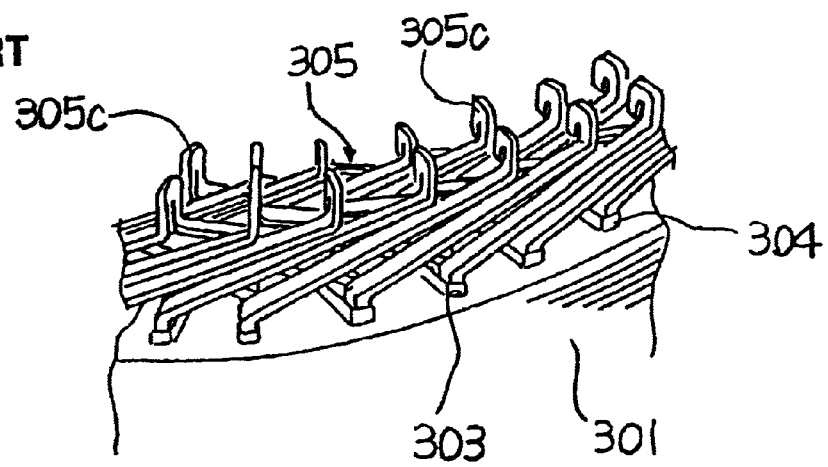
FIG. 44 is a perspective from a rear end of part of the stator in FIG. 41.
Figure 45:
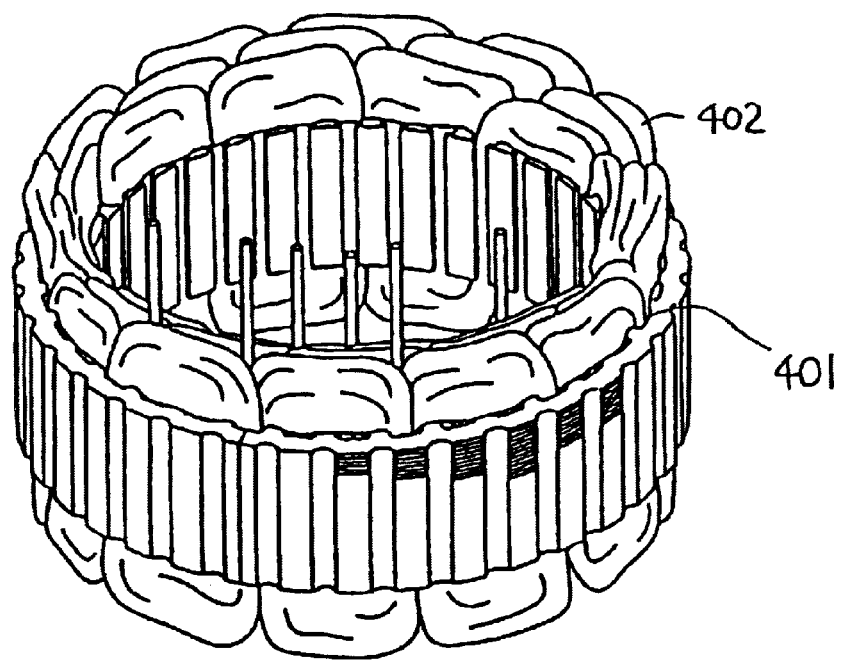
FIG. 45 is a perspective of another example of a stator of a conventional automotive alternator.

FIG. 39 is a perspective of a stator 100 according to Embodiment 10 of the present invention, FIG. 40 is a cross section of a stator core 101 of the stator 100 in FIG. 39. In Embodiment 10, the stator core 101 has only one abutting portion 102, has not a outer circumferential core portion compared to a stator core described in Embodiments 4–9. That is, in the stator core described in Embodiments 4–9, the core back of the stator core composes of the two different portions, which are the core back portion of the inner circumferential core portion and the outer circumferential core portion. In this Embodiment, the thickness of a core back 103 of a base core is 3.6 mm, the outer circumferential core portion described in Embodiments 4–9 is eliminated, the core back 103 of the stator core 101 is inseparable, and integral. The abutting portion 102 is formed inside teeth 93 having large circumferential width dimensions the same as Embodiment 8. Embodiment 10 is the same as Embodiment 4–8 about the another components of a stator winding etc.

According to Embodiment 10, the operation of fitting the outer circumferential core portion over the inner circumferential core portion is omitted. Moreover, it is difficult to improve the degree of internal diameter roundness of the stator because bending load required to bend the base core into a cylindrical shape is increased, but it is not a big problem when the internal diameter portion of the stator is worked. Further, it does not occur that output lowers by gaps between the inner circumferential core portion and the outer circumferential core portion, magnetic noise increases by lowering of the rigidity of the stator core.

Moreover, in any of the above embodiments, after insertion of the winding groups into the slots of the parallelepiped core, a processing jig may also be pressed against the tooth ends from a radial direction to plastically deform them and thereby narrow the opening portions of the slots.

In each of the above embodiments, insulators are first inserted on the core side before insertion of the wire-strand groups into the stator core, or long insulators are placed on top of the parallelepiped core and the wire-strand groups inserted from above so that the insulators are housed in the slots simultaneously, but the insulators may also be wound in advance onto the portions of the wire-strand groups to be housed in the slots and inserted into the slots together with the wire-strand groups. In addition, the portions of the wire-strand groups to be housed in the slots may be premolded with insulating resin. In that case, massproducibility is significantly improved.

In each of the above embodiments, an annular core prepared by rolling up a parallelepiped core may be inserted into an outer core and then integrated by shrink fitting.

As explained above, in an alternator according to one aspect of the present invention, the polyphase stator winding comprises a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core, and the stator core is provided with abutting portions extending axially such that the stator core becomes an annular shape by joining ends of the stator core at the abutting portions. Therefore, the winding is composed of long continuous strands of wire, enabling the degree of neatness of the coil ends and the space factor of the winding in the slots to be increased and facilitating the operation of manufacturing the stator.

In the alternator according to one form of this invention, the stator core may be composed of arc-shaped divided core portions. Therefore, the stator can be manufacture by inserting divided core portions from a radial direction relative to a polyphase stator winding, improving the operation of manufacturing the stator.

In the alternator according to another form of this invention, the stator core may be inseparable, and integral. Therefore, the operation of fitting the outer circumferential core portion over the inner circumferential core portion is omitted. Moreover, it is difficult to improve the degree of internal diameter roundness of the stator because bending load required to bend the base core into a cylindrical shape is increased, but it is not a big problem when the internal diameter portion of the stator is worked at working step. Further, it does not occur that output lowers by gaps between the inner circumferential core portion and the outer circumferential core portion, magnetic noise increases by lowering of the rigidity of the stator core.

In the alternator according to another aspect of this invention, the polyphase stator winding comprises a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core, and the stator core comprises: an inner circumferential core portion provided with teeth on a side near the rotor, the teeth defining the slots; and an outer circumferential core portion fitted over an outer circumferential surface of the inner circumferential core portion. Therefore, the winding is composed of long continuous strands of wire, enabling the degree of neatness of the coil ends and the space factor of the winding in the slots to be increased, and the inner circumferential core portion and the outer circumferential core portion can be integrated by inserting the inner circumferential core portion into the outer circumferential core portion from an axial dire on, facilitating the operation of manufacturing the stator.

In the alternator according to one form of this invention, the inner circumferential core portion may be provided with abutting portions such that the inner circumferential core portion becomes an annular shape by joining ends of the inner circumferential core portion at the abutting portions. Therefore, a number of winding groups may simply be inserted into the slots of the inner circumferential core portion in a straight state, simplifying the insertion an operation, and the force required to bend the inner circumferential core portion is also reduced, simplifying the operation of manufacturing the stator. The rigidity of the stator is improved and the occurrence of gaps at the abutting portion is reduced by the outer circumferential core portion, reducing magnetic resistance and improving output.

In the alternator according to another form of this invention, only one of the abutting portions may be provided. Therefore, the rigidity of the inner circumferential core portion is increased, reducing the occurrence of electromagnetic noise. Furthermore, because there is only one abutting portion where gaps can form, magnetic resistance is reduced, improving output.

In the alternator according to still another form of this invention, the outer circumferential core portion may be provided with a split portion such that a radius of curvature of said outer circumferential core portion is increased by spreading the split portion in a circumferential direction. Therefore, the operation of fitting the outer circumferential core portion over the inner circumferential core portion is improved.

In the alternator according to one form of this invention, at least one of the inner circumferential core portion and the outer circumferential core portion may be formed by laminating plate-shaped magnetic members. Therefore, the generation of eddy currents in the outer circumferential core portion is suppressed, improving output.

In the alternator according to another form of this invention, a plate thickness of the plate-shaped magnetic members of the outer circumferential core portion may be thinner than a plate thickness of the plate-shaped magnetic members of the inner circumferential core portion. Therefore, the generation of eddy currents in the outer circumferential core portion is further suppressed, improving output.

In the alternator according to still another form of this invention, a plate thickness of the plate-shaped magnetic members of the outer circumferential core portion may be thicker than a plate thickness of the plate-shaped magnetic members of the inner circumferential core portion. Therefore, the rigidity of the stator as a whole is mainly provided by the outer circumferential core portion, enabling the thickness of the plates of the plate-shaped magnetic members of the inner circumferential core portion to be made thinner.

In the alternator according to one form of this invention, the outer circumferential core portion may have a laminated construction in which the plate-shaped magnetic members are wound into a spiral shape. Therefore, the productivity of the outer circumferential core portion is improved.

In the alternator according to another form of this invention, the outer circumferential core portion may have an integral pipe shape. Therefore, a highly-rigid stator can be provided.

In the alternator according to another still form of this invention, an axial dimension of the outer circumferential core portion may be smaller than an axial dimension of the inner circumferential core portion. Therefore, the stator can be engaged in the bracket without having to undertake a separate process of cutting notches in outer circumferential edge portions.

In the alternator according to one form of this invention, a radial thickness dimension of the outer circumferential core portion is less than a radial thickness dimension of the inner circumferential core portion. Therefore, reductions in output can be suppressed.

In the alternator according to another form of this invention, a radial thickness dimension of the outer circumferential core portion may be greater than a radial thickness dimension of the inner circumferential core portion. Therefore, the inner circumferential core portion is supported by the highly-rigid outer circumferential core portion, suppressing the generation of electromagnetic noise and also further improving the roundness of the inner circumferential core portion.

In the alternator according to still another form of this invention, the inner circumferential core portion and the outer circumferential core portion may be integrated by press fitting. Therefore, contact between the inner circumferential core portion and the outer circumferential core portion is improved, reducing magnetic resistance proportionately.

In the alternator according to one form of this invention, the stator core may be formed with notch portions for reducing a pressing force in a direction which reduces a radius of curvature. Therefore, the bending process is facilitated.

In the alternator according to another form of this invention, the abutting portions may be formed inside teeth. Therefore, the abutting operation is simplified, and because the dividing surface is aligned with the direction of the major magnetic flux, reductions in output are suppressed.

In the alternator according to still another of this invention, the stator core may be provided with teeth having different circumferential width dimensions; and the abutting portion may be formed inside teeth having large circumferential width dimensions. Therefore, the rigidity of the tooth at the abutting portion is high, enabling the winding to be reliably installed in the slots. Furthermore, by varying the circumferential width dimensions, the pitch between center lines extending radially from the opening portions of the slots are made non-uniform, enabling noise and fluctuations in the generated voltage to be reduced.

What is claimed is:

1. An alternator comprising:
   a rotor for forming north-seeking (N) and south-seeking (S) poles alternately about a rotational circumference; and
   a stator comprising: a stator core surrounding said rotor; and a polyphase stator winding installed in said stator core, said stator core being formed with a number of slots extending axially at a predetermined pitch in a circumferential direction, said polyphase stator winding comprising a number of winding portions, wherein each winding portion comprises a long strand of wire wound so as to alternately occupy an inner layer and an outer layer in a slot depth direction within said slots at intervals of a predetermined number of slots, said strands of wire folding back outside said slots at both axial end surfaces of said stator core, and said stator core being provided with an abutting portion extending axially such that said stator core becomes an annular shape by joining ends of said stator core at said abutting portion.

2. The alternator according to claim 1 wherein said stator core is composed of arc-shaped divided core portions.

3. The alternator according to claim 1 wherein said stator core has an inseparable, integral core back.

4. The alternator according to claim 3 wherein only one said abutting portion is provided.

5. The alternator according to claim 4 wherein said stator core is formed with notch portion for reducing a pressing force in a direction which reduces a radius of curvature of said core.

6. The alternator according to claim 5 wherein sad abutting portion is formed inside a tooth.

7. The alternator according to claim 6 wherein:

said stator core is provided with teeth having different circumferential width dimensions; and said abutting portion is formed inside a tooth having a larger circumferential width.

8. The alternator according to claim 1, wherein said long strands of wire are wound in the circumferential direction.

* * * * *